US006882969B2

(12) United States Patent
Fushimi et al.

(10) Patent No.: US 6,882,969 B2
(45) Date of Patent: Apr. 19, 2005

(54) VARIABLE BIT RATE DIGITAL CIRCUIT MULTIPLICATION EQUIPMENT WITH TANDEM PASSTHROUGH FUNCTION

(75) Inventors: Wataru Fushimi, Tokyo (JP); Shigeaki Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 502 days.

(21) Appl. No.: 09/827,915

(22) Filed: Apr. 9, 2001

(65) Prior Publication Data

US 2001/0029450 A1 Oct. 11, 2001

(30) Foreign Application Priority Data

Apr. 10, 2000 (JP) ..................................... 2000-108493
Mar. 28, 2001 (JP) ..................................... 2001-093635

(51) Int. Cl.[7] ........................................... G10L 19/00
(52) U.S. Cl. ....................... 704/201; 704/226; 704/270
(58) Field of Search ..................... 379/100.17; 704/201, 704/226, 270

(56) References Cited

U.S. PATENT DOCUMENTS

| | | | | | |
|---|---|---|---|---|---|
| 4,924,480 A | * | 5/1990 | Gay et al. | ................... | 375/222 |
| 5,117,453 A | * | 5/1992 | Piasecki et al. | ........ | 379/100.17 |
| 5,488,715 A | * | 1/1996 | Wainwright | ................... | 714/4 |
| 6,006,189 A | * | 12/1999 | Strawczynski et al. | ..... | 704/270 |
| 6,549,515 B1 | * | 4/2003 | Sourani et al. | ............ | 370/232 |
| 6,600,720 B1 | * | 7/2003 | Gvozdanovic | .............. | 370/230 |

FOREIGN PATENT DOCUMENTS

JP 190667 7/1998

* cited by examiner

*Primary Examiner*—Susan McFadden
(74) *Attorney, Agent, or Firm*—Birch, Stewart, Kolasch & Birch, LLP.

(57) ABSTRACT

Digital circuit multiplication equipment (DCME) refers to coding bit rate information included in a pseudo-speech signal. In accordance with the coding bit rate information, the DCME selects either a coded speech signal extracted by a transmission bit rate restorer or a coded speech signal including bit rate identification information added by a coding bit rate information adding section, and supplies the selected coded speech signal to a bearer line. The DCME can solve a problem of a conventional DCME in that a mismatch can take place between the actual transmission bit rate of the coded speech signal and the transmission bit rate assigned to the bearer line when providing the variable bit rate DCME with a tandem passthrough function, and therefore the correct coding bit rate information cannot be transferred to a speech decoder, bringing about serious degradation in the speech quality.

11 Claims, 15 Drawing Sheets

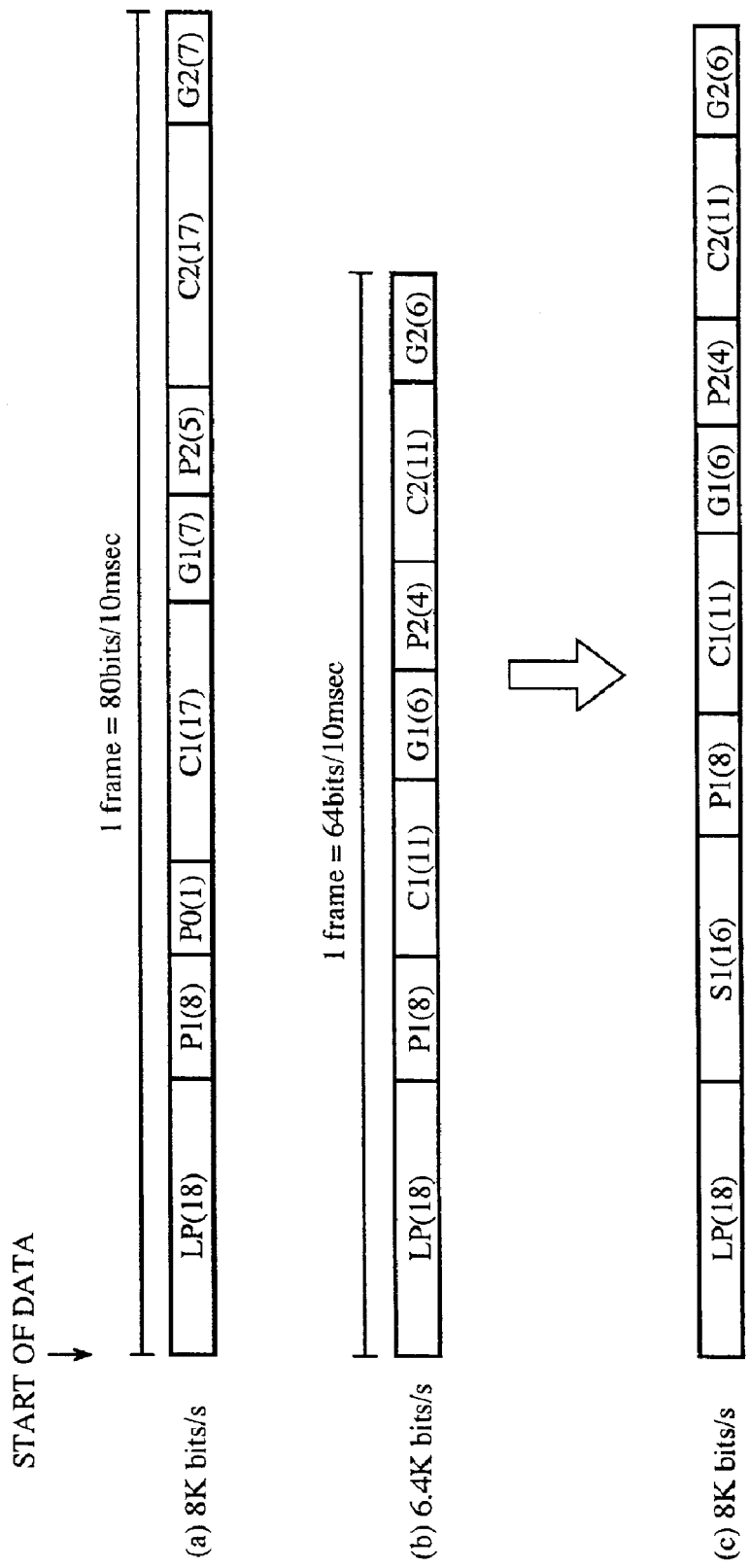

VARIABLE BIT RATE DIGITAL CIRCUIT MULTIPLICATION EQUIPMENT WITH TANDEM PASSTHROUGH FUNCTION

BACKGROUND OF THE INVENTION

1. Field of the Invention

The present invention relates to variable bit rate digital circuit multiplication equipment for carrying out tandem relay of speech.

2. Description of Related Art

Long-distance telecommunications including international telecommunications and others utilize DCME (Digital Circuit Multiplication Equipment) for reducing communication cost.

DCME is a device for efficiently transmitting voice-band data such as telephone speech, facsimile signals and data modem signals by combining a DSI (Digital Speech Interpolation) technique that transmits only speech activity with a low bit rate speech coding technique. In particular, variable bit rate DCME is a device that can vary its coding bit rate of the telephone speech in response to the load condition on a bearer line (transmission line).

FIG. 10 is a block diagram showing a configuration of a conventional variable bit rate DCME. In FIG. 10, the reference numeral 1 designates a speech activity decision section for receiving a PCM signal and for making a decision as to whether the input signal to each trunk channel is in speech active state or not; 2 designates a signal discriminating section for receiving the PCM signal and for identifying whether the input signal to each trunk channel is telephone speech or a data signal like a facsimile signal; 3 designates a speech coding section for encoding the PCM signal and outputting a coded speech signal; 4 designates an assignment controller for assigning transmission bit rate of each trunk channel to a bearer line in accordance with the decision result of the speech activity decision section 1 and the identification result of the signal discriminating section 2; 5 designates a message generator for generating an assignment message in accordance with the assignment result of the assignment controller 4; and 6 designates a multiplexer for multiplexing the coded speech signals of the individual trunk channels output from the speech coding section 3 in accordance with the assignment result by the assignment controller 4, and for multiplexing the assignment messages generated by the message generator 5, outputting the multiplexed signal to the bearer line.

The reference numeral 7 designates a demultiplexer that demultiplexes a signal from the bearer line including multiplexed coded speech signals and assignment messages, and supplies the assignment messages to a message decoder 8 and the coded speech signals to a speech decoder 9; 8 designates the message decoder that decodes each assignment message provided from the demultiplexer 7, and supplies the demultiplexer 7 with the decoded result and the speech decoder 9 with the assignment information on each trunk channel and with coding bit rate information; and 9 designates the speech decoder that decodes each coded speech signal provided from the demultiplexer 7 in accordance with the assignment information and coding bit rate information supplied from the message decoder 8, and sends a resultant PCM signal to each trunk (circuit switch) side channel.

In FIG. 10, the left-hand side is the trunk (circuit switch) side where the telephone speech/voice-band data of a plurality of channels are input or output in a 64-kbit/s PCM (Pulse Code Modulation) scheme. The right-hand side is a bearer (transmission line) side where the low bit rate coded telephone speech/voice-band data (coded speech signals) are transmitted or received.

Here, for convenience-in explanation, it is assumed that the trunk side has a capacity for transferring 600-channel 64-kbit/s telephone speech/voice-band data, and that the bearer side has a line capacity of 2 Mbits/s. It is further assumed in the following description that as the low bit rate speech coding bit rate, the telephone speech transmission uses 8 kbits/s or 6.4 kbits/s, whereas the voice-band data signal transmission utilizes 40 kbits/s.

Next, the operation of the conventional DCME will be described.

The 600-channel 64-kbits/s PCM signals input from the trunk side are supplied to the speech activity decision section 1, signal discriminating section 2 and speech coding section 3.

The speech activity decision section 1 decides the speech activity/silence of each trunk channel, and supplies the decision result to the assignment controller 4.

The signal discriminating section 2 decides as to whether the input signal to each trunk channel is the telephone speech or the data signal like a facsimile signal, and supplies the discrimination result to the assignment controller 4.

Receiving the decision result and discrimination result from the speech activity decision section 1 and signal discriminating section 2, the assignment controller 4 decides a bit rate assigned to each trunk channel on the bearer line in accordance with the decision result and discrimination result, and supplies the assignment result to the speech coding section 3, message generator 5 and multiplexer 6.

In the assignment to the bearer line, speech activity trunk channels are assigned to the bearer line first. In this case, trunk channels decided as transferring data signals are assigned 40 kbits/s per channel, whereas trunk channels decided as transferring telephone speech are each assigned 8 kbits/s or 6.4 kbits/s.

The coding bit rate is changed depending on the signal types. This is because the information compression principle of the low bit rate speech coding is based on reducing the redundancy of the speech signals by utilizing that redundancy, and hence high-degree compression is possible for the telephone speech, but not for the voice-band data like facsimile signals.

The telephone speech is assigned one of the two bit rates. It is usually assigned 8 kbits/s on the bearer line, which is reduced to 6.4 kbits/s when the bearer line becomes congested to enable new assignment.

As for a 32 kbit/s transmission line, for example, although it is occupied by four 8 kbit/s channels, it can provide five channels for 6.4 kbits/s.

The speech coding section 3 includes 600-channel speech encoders. Referring to coding bit rate information provided from the assignment controller 4 as the assignment result, the speech coding section 3 encodes the input signal from each trunk channel at a bit rate of 8 kbits/s or 6.4 kbits/s when it is the telephone speech, and at a bit rate of 40 kbits/s when it is the voice-band data, and supplies the coded speech signals to the multiplexer 6.

On the other hand, the message generator 5 generates the assignment message to be transferred to party equipment in accordance with the assignment result of the assignment controller 4.

An example of the assignment message will now be described with reference to FIG. 11 that shows a structure of a frame (DCME frame) the DCME outputs to the bearer line. In this example, there are 248 bearer channels (BCs) for transmitting the coded speech signals and a message channel for transmitting the assignment message on the bearer line.

Each BC has a capacity of 8 kbits/s so that 248-channel 8-kbit/s coded speech signals are transmitted at the maximum. A 40-kbit/s coded speech signal is transmitted using 5-channel BCs.

Incidentally, the DCME frame length is usually set at an integer multiple of an 8-kbit/s speech coding frame length and a 40-kbit/s speech coding frame length. For example, when the 8-kbit/s speech coding frame length is 10 ms and the 40-kbit/s speech coding frame length is 2.5 ms, the DCME frame length is preferably set at 10 ms.

In the present specification, the DCME frame length is assumed to be 10 ms in the following description (thus, the number of bits in each BC is 10 ms×8000=0.01 s×8000=80 bits). The message channel can transmit four messages, each of which consists of a pair of a trunk channel number (TC number) and a bearer channel number (BC number). For example, when the trunk channel "5" is newly connected to the bearer channel 3, a message TC number=5 and BC number=3 is transmitted.

Usually, the TC number=0 indicates disconnection. For example, to disconnect the trunk connected to the BC50, the message TC number=0 and BC number=50 is transmitted.

Thus, the assignment message is for transmitting to the party equipment the information about how each trunk channel is assigned to the bearer line. To save the message channel capacity, only information about a change in the assignment is formed as a message. Accordingly, when many changes take place as when many trunk channels simultaneously shift from a silent to speech activity state, some channels may have to wait until they are assigned to the bearer line.

In accordance with the assignment result to the bearer line by the assignment controller 4, the multiplexer 6 multiplexes the coded speech signals from the trunk channels output from the speech coding section 3, along with the assignment message output from the message generator 5, and outputs the multiplexed signal to the bearer line.

Next, the operation on the receiving side will be described.

The demultiplexer 7, receiving a signal including the coded speech signals and the assignment message multiplexed from the bearer line, demultiplexes them, and supplies the assignment message to the message decoder 8 and the coded speech signals to the speech decoder 9.

To demultiplex the coded speech signals, the demultiplexer 7 refers to the decoding result of the assignment message by the message decoder 8.

The mess age decoder 8, receiving the assignment message from the demultiplexer 7, decodes it and supplies its result to the demultiplexer 7. It also supplies the speech decoder 9 with the assignment information on the trunk channels and the coding bit rate information.

The speech decoder 9, receiving the assignment information and coding bit rate information from the message decoder 8, decodes the coded speech signals output from the demultiplexer 7 with reference to the information, and outputs PCM signals to the trunk side channels.

As described above, the DCME carries out low bit rate coding of the 64-kbit/s PCM signal sent via each trunk channel to an 8-kbit/s, 6.4-kbit/s or 40-kbit/s signal, and transmits the speech activity signals in precedence. Accordingly, it can transmit the telephone speech or facsimile signal efficiently.

Next, let us consider a network configuration as shown in FIG. 12, where such DCMEs are installed at three sites.

During communications between a telephone 110 and a telephone 111, the speech signal sent from the telephone 110 undergoes low bit rate coding by the DCME 100, and is decoded by the DCME 101 to a PCM signal. The PCM signal is transferred to a DCME 102 via a circuit switch 106. The DCME 102 carries out the low bit rate coding of the signal, and transmits it to a DCME 103. The DCME 103 decodes the low bit rate coded signal to a PCM signal, and sends it to the telephone 111. Thus, the network configuration as shown FIG. 12 that employs the DCMEs repeats the low bit rate coding and decoding twice, bringing about speech quality degradation.

To avoid such a problem, a technique called tandem passthrough is actually used in such fields as speech ATM communications.

FIG. 13 is a block diagram showing a configuration of a voice over ATM transmission system with the tandem passthrough function, which is disclosed in Japanese patent application laid-open No. 10-190667. In FIG. 13, the same reference numerals designate the same or like portions to those of FIG. 10, and hence the description thereof is omitted here.

In FIG. 13, the reference numeral 10 designates a cell disassembly section for disassembling ATM cells supplied from the bearer line side and outputting them; 11 designates a pseudo-speech signal generator that converts the 8-kbit/s and 40-kbit/s coded speech signal into a 64-kbit/s pseudo-speech signal that can be handled by the tandem circuit switch without decoding them (for example, the 8-kbit/s coded speech signal is converted into a pseudo 64-kbit/s signal by adding 56-kbit/s dummy data), and that outputs the pseudo-speech signal; and 12 designates a second comfort noise generator for generating comfort noise corresponding to background noise during idle state.

The reference numeral 13 designates a first pattern inserting section for inserting a first pattern signal that causes a party voice over ATM transmission system at the relay to identify that it is a tandem connection; 14 designates a selector for selecting and outputting either the pseudo-speech signal output from the pseudo-speech signal generator 11 or the comfort noise output from the second comfort noise generator 12; 15 designates a second pattern inserting section for inserting a second pattern signal that causes the party ATM system at the relay to identify that it is in the tandem switching state by detecting the second pattern signal; and 16 designates a selector for selecting and outputting either the output signal from the first pattern inserting section 13 or the output signal from the second pattern inserting section 15.

The reference numeral 17 designates a first pattern detector for detecting the first pattern signal sent from the party ATM system at the relay; 18 designates a second pattern detector for detecting the second pattern signal sent from the party ATM system at the relay; 19 designates a transmission bit rate restorer for converting the pseudo-speech signal sent from the circuit switch side into the coded speech signal with original coding bit rate by deleting the 56-kbit/s dummy data from the pseudo-speech signal; 20 designates a selector for selecting and outputting either the coded speech signal output from the speech coding section 3 or the codedspeech signal output from the transmission bit rate restorer 19; 21 designates a first comfort noise generator for generating low bit rate coded comfort noise corresponding to background noise in the idle state; 22 designates a selector for selecting and outputting either the low bit rate coded comfort noise output from the first comfort noise generator 21 or the coded speech signal output from the selector 20; and 23 designates a cell assembly section for assembling the coded speech signal into ATM cells and for outputting the cells.

The operation of the conventional ATM system as shown in FIG. 13 will now be described assuming that it is utilized in place of the DCME 100, DCME 101, DCME 102 and DCME 103 as shown in FIG. 12.

First, the operation of the voice over ATM transmission system used in place of the DCME 102 will be described when communication is conducted between the telephones 112 and 113 in FIG. 12 (in the case of non-tandem connection).

It is assumed in the initial state that the selector 14 selects the output of the pseudo-speech signal generator 11, the selector 16 selects the output of the first pattern inserting section 13, the selector 20 selects the output of the speech coding section 3, and the selector 22 selects the output of the selector 20, as shown in FIG. 13.

When the tandem circuit switch does not establish a tandem connection, since neither the first pattern detector 17 nor the second pattern detector 18 detects the first pattern signal or the second pattern signal from the output signal of sent from the trunk side, they output a signal indicating a non-detection state. Thus, the selectors 20, 22, 14 and 16 maintain their initial states.

Thus, the speech signal path on the transmitting side passes through the speech coding section 3, selector 20, selector 22 and cell assembly section 23, whereas the speech signal path on the receiving side passes through the cell disassembly section 10, speech decoder 9, first pattern inserting section 13 and selector 16 so that normal speech coding and decoding are carried out.

In this case, on the path on the receiving side, the first pattern inserting section 13 inserts the first pattern into the PCM signal output from the speech decoder 9.

The PCM signal output from the speech decoder 9 is a signal obtained by sampling a speech signal waveform at every 125 microseconds and by quantizing the amplitude of the sampled waveform into 8-bit data. Thus, it becomes a 64-kbit/s signal because 8÷125 microseconds=8÷0.000125= 64000.

To minimize the degradation in the speech quality due to the first pattern insertion, the first pattern inserting section 13 carries out bit steal of only the LSB (Least Significant Bit) of an 8-bit quantized value at every several sampling interval for the PCM signal, thereby embedding a specified pattern. Thus, the first pattern insertion can implement communications without adding any substantial effect on the quality of the original PCM speech signal waveform. The operation of the voice over ATM transmission system placed at the position of the DCME 103, which is connected via the bearer line to the voice over ATM transmission system at the site of the DCME 102, is identical to that of the system placed at the site of the DCME 102.

Next, the operation of the voice over ATM transmission systems placed at the sites of the DCMEs 101 and 102 will be described when the tandem connection is established in the tandem circuit switch, that is, when the communication is carried out between the telephones 110 and 111 in FIG. 12.

When the voice over ATM transmission systems 60B and 60C corresponding to the DCMEs 101 and 102 are connected via the circuit switch 106 as shown in FIG. 14, the first pattern detector 17 of the voice over ATM transmission system 60B detects the first pattern inserted by the first pattern inserting section 13 of the voice over ATM transmission system 60C, and likewise the first pattern detector 17 of the voice over ATM transmission system 60C detects the first pattern inserted by the first pattern inserting section 13 of the voice over ATM transmission system 60B at the initial stage.

Thus, each of the voice over ATM transmission systems 60B and 60C changes its state such that the selector 16 selects the output of the second pattern inserting section 15, the selector 14 selects the output of the second comfort noise generator 12 and the selector 22 selects the output of the first comfort noise generator 21.

In each of the voice over ATM transmission systems 60B and 60C in this state, the signal path on the receiving side passes through the second comfort noise generator 12, selector 14, second pattern inserting section 15 and selector 16, whereas the signal path on the transmitting side passes through the first comfort noise generator 21, selector 22 and cell assembly section 23.

The second comfort noise generator 12 outputs 64-kbit/s PCM comfort noise. The second pattern inserting section 15 inserts the second pattern into the comfort noise (PCM signal) output from the second comfort noise generator 12. Specifically, the second pattern inserting section 15 carries out bit steal of only the second least significant bit of an 8-bit quantized value at every several sampling interval of the PCM signal to embed a specified pattern such that the second pattern can be distinguished from the first pattern and that the effect on the signal output from comfort noise generator 12 is minimized.

In this way, the voice over ATM transmission systems 60B and 60C each send a silent PCM signal including the second pattern to the circuit switch side. On the other hand, the first comfort noise generator 21 outputs a silent signal encoded at the 8 kbit/s bit rate or comfort noise. Accordingly, the voice over ATM transmission systems 60B and 60C send the silent signal or comfort noise to the bearer line side.

In the next stage, the voice over ATM transmission systems 60B and 60C each receive the silent PCM signal including the second pattern from the circuit switch side. Thus, the second pattern detector 18 detects the second pattern, and outputs a signal indicating its detection. In response to the signal, the selector 20 selects the output of the transmission bit rate restorer 19.

On the other hand, since the first pattern detector 17 cannot detect the first pattern, it outputs a signal indicating non-detection. In response to the signal, the current state is changed such that the selector 22 selects the output of the selector 20, and the selector 14 selects the output of the pseudo-speech signal generator 11.

As for the state of the selector 16, it maintains selecting the output of the second pattern inserting section 15 to be output. The pseudo-speech signal generator 11 generates the 64-kbit/s pseudo-speech signal by adding dummy data to the 8-kbit/s coded speech signal supplied from the cell disassembly section 10. The second pattern inserting section 15 inserts the second pattern to a part of the pseudo-speech signal. In this case, the pseudo-speech signal is assembled such that its part corrupted by inserting the second pattern becomes the dummy data. Thus, the 8-kbit/s coded speech signal is output without any problem.

The transmission bit rate restorer 19, receiving the pseudo-speech signal, extracts the 8-kbit/s coded speech signal and supplies it to the selector 20. The operation described above can implement the passthrough operation because the coded speech signal disassembled by the cell disassembly section 10 of the ATM transmission system 60B arrives at the cell assembly section 23 of the voice over ATM transmission system 60C, and reversely the coded speech signal disassembled by the cell disassembly section 10 of the ATM transmission system 60C arrives at the cell assembly section 23 of the voice over ATM transmission system 60B.

Applying the tandem passthrough function to the DCME as shown in FIG. 10 makes it possible for a link including the plurality of DCMEs to transmit telephone speech without degrading the speech quality.

With the foregoing configuration, the conventional digital circuit multiplication equipment has the following problems when the tandem passthrough function is applied to the variable bit rate DCME.

Let us consider a case, for example, where the telephone 110 communicates with the telephone 111 in FIG. 12, and the tandem passthrough operation is implemented by transmitting the speech signal through a trunk channel between the DCME 101 and the DCME 102. Here, the bearer line assignment from the DCME 100 to the DCME 101 can be changed depending on the speech activity/silence state, signal discrimination state and bearer load state detected by the DCME 100. For example, an increase in the bearer line load can change the speech coding bit rate of the speech signal sent from the telephone 110 from 8 kbits/s to 6.4 kbits/s. In this case, the DCME 101 can notify the DCME 102 of the change by embedding the speech activity/silence information and speech coding bit rate information into the pseudo-speech signal transmitted from the DCME 101 to the DCME 102.

It is also possible for the DCME 102 to determine the assignment of the trunk channel to the bearer line in accordance with the speech coding bit rate information and speech activity/silence information embedded into the pseudo-speech signal, and transmits information about the assignment to the DCME 103. However, it is not always possible for the DCME 102 to carry out the assignment to the bearer line as required by the speech coding bit rate information and speech activity/silence information embedded in the pseudo-speech signal, depending on the load condition of the bearer line to which the DCME 102 transmits the signal.

For example, if all the trunk channels connected to the bearer line are in speech activity state, and hence occupy the bearer line, even if a request arrives to change from 6.4 kbits/s to 8 kbits/s, the assignment change to the 8-kbit/s is detained, maintaining the 6.4-kbit/s state. Such a bit rate mismatch can also take place because the message number is limited. When such a mismatch takes place between the actual transmission bit rate of the coded speech signal and the assigned transmission bit rate on the bearer line, the speech decoder 9 cannot be provided with correct coding bit rate information, bringing about serious speech quality degradation.

As described above, implementing the tandem passthrough function by the variable bit rate DCME unavoidably involves a mismatch between the actual transmission bit rate of the coded speech signal and the assigned transmission bit rate on the bearer line, which presents a problem of degrading the speech quality seriously because the correct coding bit rate information cannot be supplied to the speech decoder.

SUMMARY OF THE INVENTION

The present invention is implemented to solve the foregoing problem. It is therefore an object of the present invention to provide digital circuit multiplication equipment capable of implementing high quality transmission by preventing speech quality degradation.

According to a first aspect of the present invention, there is provided digital circuit multiplication equipment having a tandem passthrough function of carrying out passthrough transmission of a coded speech signal, and a variable bit rate function of varying a transmission bit rate of the coded speech signal in accordance with a load on the equipment, the digital circuit multiplication equipment comprising: dummy data adding means for generating a pseudo-speech signal with a predetermined transmission bit rate by adding dummy data including coding bit rate information to a coded speech signal supplied from a transmission line, and for supplying the pseudo-speech signal to a tandem circuit switch; speech signal extracting means for extracting a coded speech signal from a pseudo-speech signal supplied from the tandem circuit switch; bit rate identification information adding means for adding bit rate identification information to the coded speech signal extracted by the speech signal extracting means; and speech signal output means for selecting, with reference to coding bit rate information included in the pseudo-speech signal, one of the coded speech signal extracted by the speech signal extracting means and the coded speech signal including the bit rate identification information added by the bit rate identification information adding means, and for delivering the selected coded speech signal to the transmission line.

Here, the digital circuit multiplication equipment may further comprise load measuring means for measuring a load imposed on the equipment, wherein the speech signal output means may carry out the selection of the coded speech signal only when the load on the equipment exceeds a predetermined threshold value.

The load measuring means may consist of a message number supervisor for measuring a number of messages on a message channel assigned to the transmission line.

The load measuring means may consist of a speech activity channel number supervisor for measuring a number of trunk channels in a speech active state.

The load measuring means may consist of a bearer occupancy rate supervisor for measuring a bearer occupancy rate of the transmission line.

The digital circuit multiplication equipment may further comprise information reduction means for reducing information amount of the coded speech signal extracted by the speech signal extracting means, wherein the speech signal output means may select one of three coded speech signals consisting of the coded speech signal extracted by the speech signal extracting means, the coded speech signal including the bit rate identification information added by the bit rate identification information adding means, and the coded speech signal whose information amount by the information reduction means.

According to a second aspect of the present invention, there is provided a digital circuit multiplication equipment having a tandem passthrough function of carrying out passthrough transmission of a coded speech signal, and a variable bit rate function of varying a transmission bit rate of the coded speech signal in accordance with a load on the equipment, the digital circuit multiplication equipment comprising: message notifying means for supplying a transmission line with a message indicating a trunk channel in a passthrough state; and bit rate fixing means for fixing, when receiving a message indicating a trunk channel in a passthrough state from the transmission line, a transmission bit rate of a coded speech signal on the trunk channel indicated by the message to a predetermined bit rate.

Here, when the message notifying means outputs the message, it may utilize a bearer channel number in a message channel assigned to the transmission line.

When the message notifying means outputs the message, it may utilize a trunk channel number in a message channel assigned to the transmission line.

According to a third aspect of the present invention, there is provided a digital circuit multiplication equipment having a tandem passthrough function of carrying out passthrough transmission of a coded speech signal, and a variable bit rate function of varying a transmission bit rate of the coded speech signal in accordance with a load on the equipment, the digital circuit multiplication equipment comprising: detecting means for detecting a start of a passthrough operation of a trunk channel; assignment means for assigning the trunk channel that starts the passthrough operation to one of a passthrough clique and a bit bank; and speech signal output means for transmitting a coded speech signal on the trunk channel through one of the passthrough clique and the bit bank assigned by the assignment means.

Here, the clique may consist of a series of data sequences consisting of a message channel and a plurality of bearer channels, and the bit bank may consist of a series of data sequences forming a dedicated transmission line using a plurality of bearer channels.

BRIEF DESCRIPTION OF THE DRAWINGS

FIG. 15 is a diagram illustrating examples of a coded speech signal output from a transmission bit rate restorer 19.

DETAILED DESCRIPTION OF THE PREFERRED EMBODIMENTS

The invention will now be described with reference to the accompanying drawings.

Embodiment 1

Figure 1:
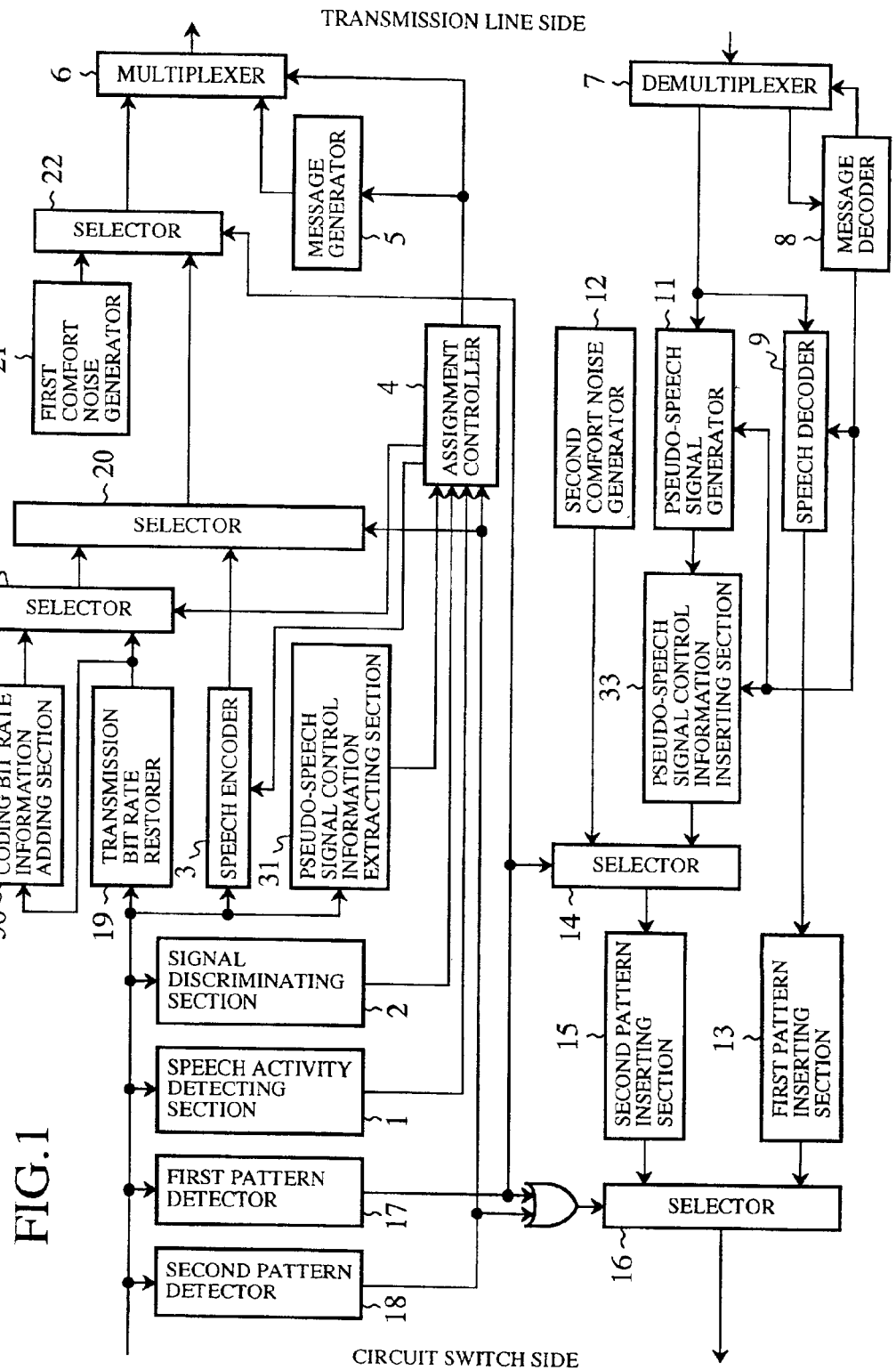
FIG. 1 is a block diagram showing a configuration of an embodiment 1 of the digital circuit multiplication equipment in accordance with the present invention.
Figure 10:
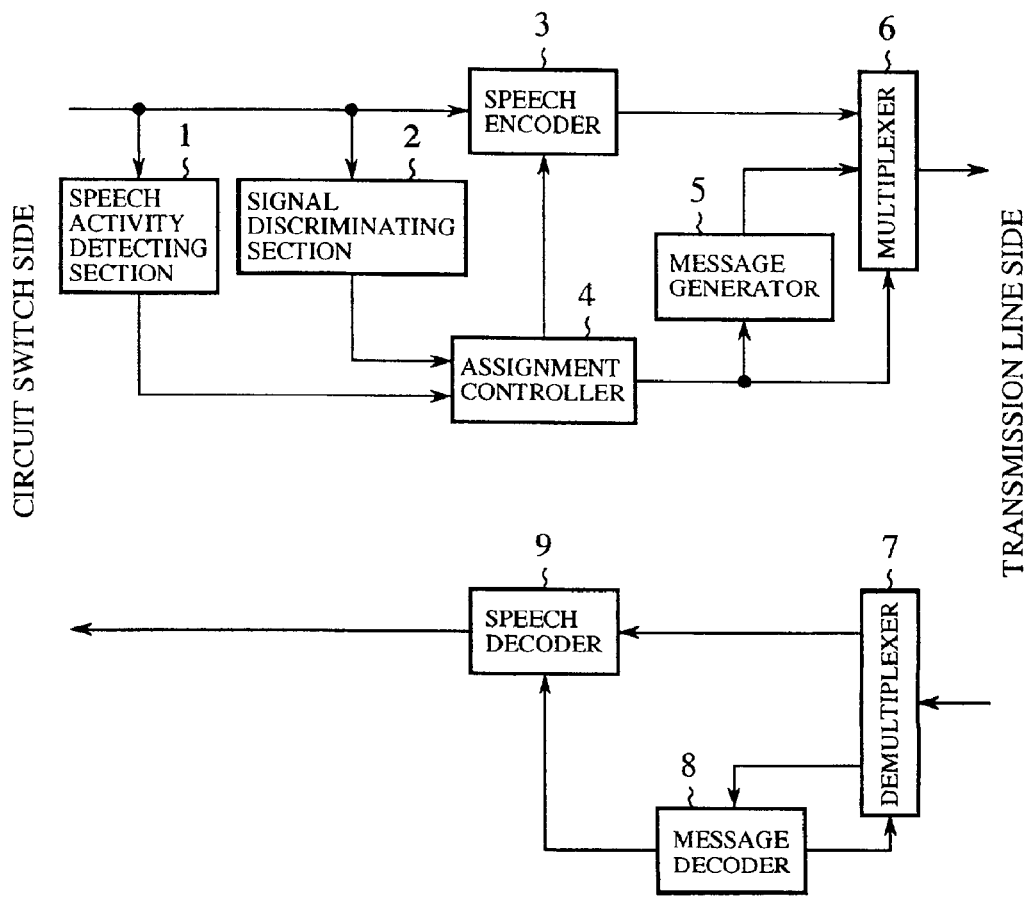
FIG. 10 is a block diagram showing a configuration of a conventional variable bit rate DCME.
Figure 13:
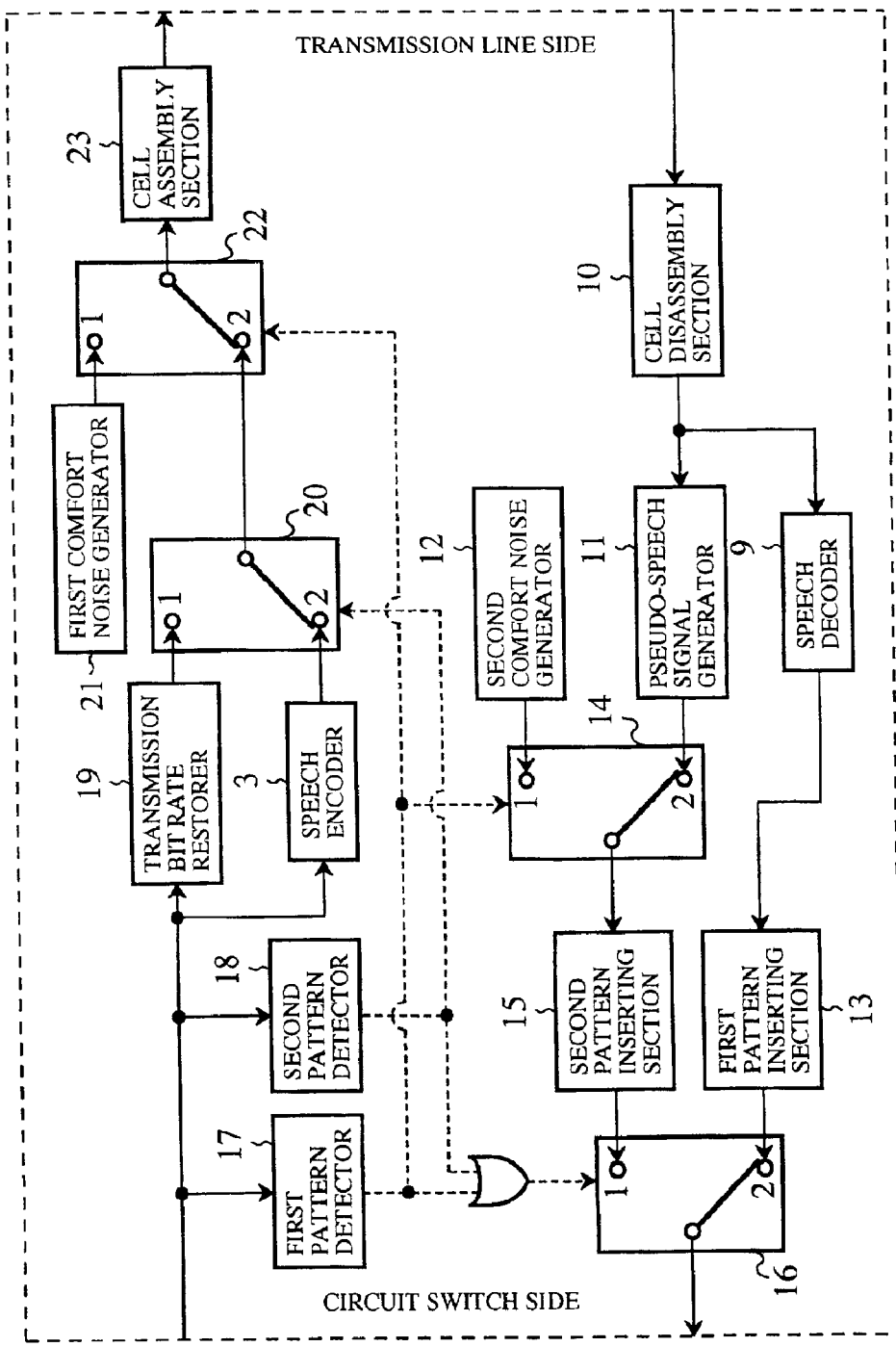
FIG. 13 is a block diagram showing a configuration of a conventional voice over ATM transmission system with a tandem passthrough function.
Figure 14:
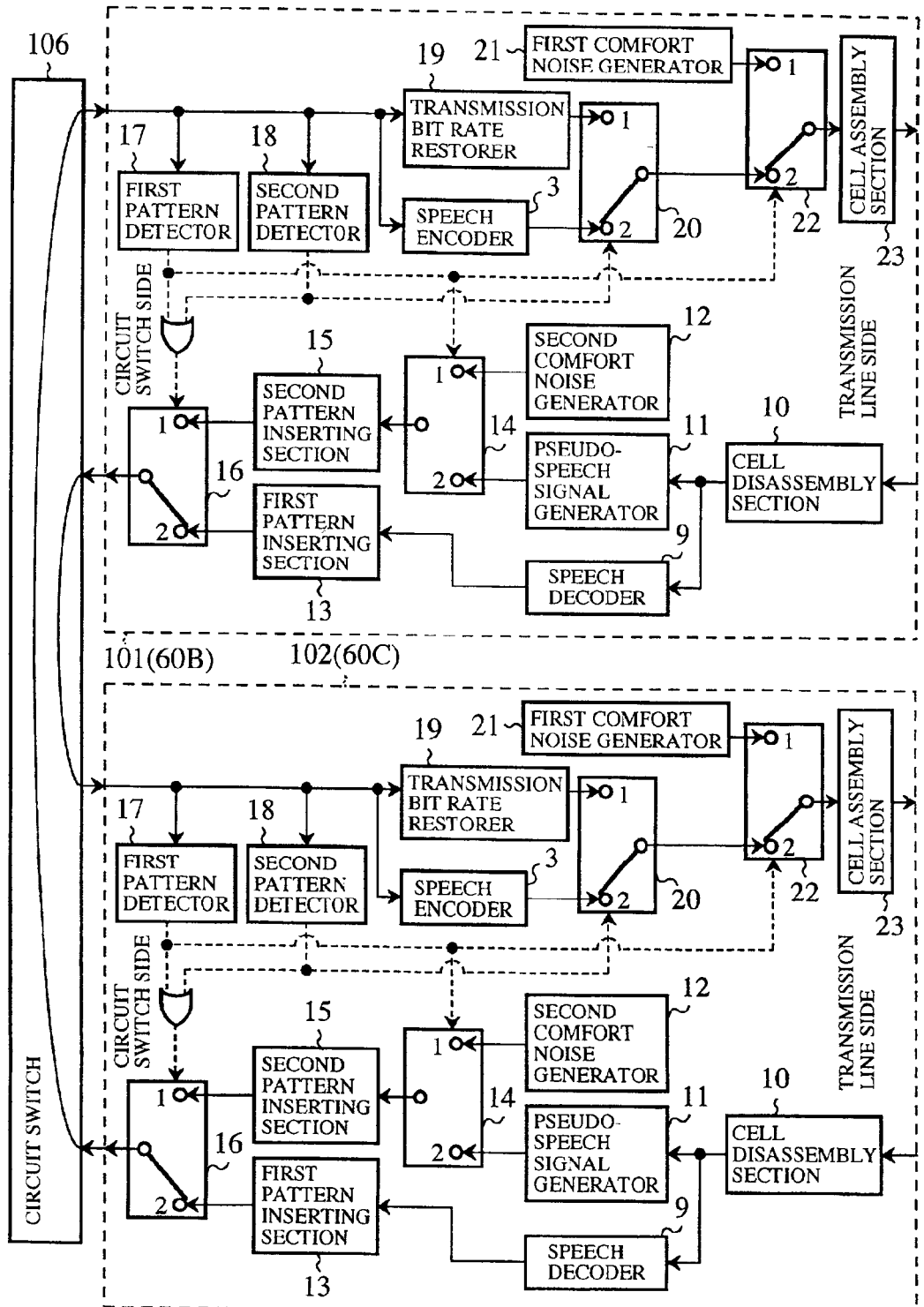
FIG. 14 is a block diagram showing an example of connection between a circuit switch and the conventional voice over ATM transmission systems.

FIG. 1 is a block diagram showing a configuration of an embodiment 1 of the digital circuit multiplication equipment in accordance with the present invention. In FIG. 1, the same reference numerals designate the same or like portions to those of FIGS. 10 and 13. The basic structure and operation of the digital circuit multiplication equipment as shown in FIG. 1 are described in Japanese patent application laid-open No. 10-190667, which is incorporated herein by reference.

In FIG. 1, the reference numeral 1 designates a speech activity detecting section for receiving a PCM signal and for making a decision as to whether the input signal from each trunk channel is in speech active state or not; 2 designates a signal discriminating section for receiving the PCM signal and for deciding as to whether the input signal to each trunk channel is a telephone speech or a data signal like a facsimile signal; 3 designates a speech coding section for encoding the PCM signal and outputting a coded speech signal; 4 designates an assignment controller for assigning transmission bit rate of each trunk channel to bearer lines in accordance with the decision result of the speech activity detecting section 1 and the discrimination result of the signal discriminating section 2; 5 designates a message generator for generating an assignment message in accordance with the assignment result of the assignment controller 4; and 6 designates a multiplexer for multiplexing, in accordance with the assignment result fed from the assignment controller 4, the coded speech signals of the individual trunk channels output from the speech coding section 3, along with the assignment message generated by the message generator 5, to be output to the bearer line.

The reference numeral 7 designates a demultiplexer that demultiplexes a signal from the bearer line including the coded speech signals and the assignment message multiplexed, and supplies the assignment message to a message decoder 8 and the coded speech signal to a speech decoder 9 and a pseudo-speech signal generator 11; 8 designates the message decoder that decodes the assignment message supplied from the demultiplexer 7 and supplies the decoded result to the demultiplexer 7, and the assignment information and coding bit rate information on the individual trunk channels to the speech decoder 9 and a pseudo-speech signal control information inserting section 33; and 9 designates the speech decoder that decodes the coded speech signal supplied from the demultiplexer 7 in accordance with the assignment information and coding bit rate information supplied from the message decoder 8, and outputs the resultant PCM signal.

The reference numeral 11 designates a pseudo-speech signal generator that converts the 8-kbit/s and 40-kbit/s coded speech signal into a 64-kbit/s pseudo-speech signal that can be handled by the tandem circuit switch without decoding them; 12 designates a second comfort noise generator for generating comfort noise corresponding to background noise in the idle state; and 33 designates a pseudo-speech signal control information inserting section for inserting the speech activity/silence information and coding bit rate information into the pseudo-speech signal. The pseudo-speech signal generator 11 and pseudo-speech signal control information inserting section 33 constitute a dummy data adding means.

The reference numeral 13 designates a first pattern inserting section for inserting a first pattern signal that causes a party DCME at the relay to identify that it is a tandem connection; 14 designates a selector for selecting and outputting either the pseudo-speech signal output from the pseudo-speech signal control signal inserting section 33 or the comfort noise output from the second comfort noise generator 12; 15 designates a second pattern inserting section for inserting a second pattern signal that causes the party DCME at the relay to identify that it is in the tandem switching state by detecting the second pattern signal by the DCME; and 16 designates a selector for selecting and outputting either the output signal from the first pattern inserting section 13 or the output signal from the second pattern inserting section 15.

The reference numeral 17 designates a first pattern detector for detecting the first pattern signal sent from the party DCME at the relay; 18 designates a second pattern detector for detecting the second pattern signal sent from the party DCME at the relay; 19 designates a transmission bit rate restorer for converting the pseudo-speech signal sent from the circuit switch side into the coded speech signal with the original coding bit rate by deleting the 56-kbit/s dummy data from the pseudo-speech signal; 30 designates a coding bit rate information adding section (bit rate identification information adding means) for adding the bit rate identification information to the coded speech signal extracted by the transmission bit rate restorer 19; 31 designates a pseudo-speech signal control information extracting section for extracting the speech activity/silence information and coding bit rate information included in the pseudo-speech signal; and 32 designates a selector for selecting and outputting-, under the control of the assignment controller 4, either the coded speech signal extracted by the transmission bit rate restorer 19 or the coded speech signal including the bit rate identification information added by the coding bit rate information adding section 30.

The reference numeral 20 designates a selector for selecting and outputting either the coded speech signal output from the speech coding section 3 or the coded speech signal output from the selector 32; 21 designates a first comfort noise generator for generating low bit rate coded comfort noise corresponding to background noise in the idle state; and 22 designates a selector for selecting and outputting either the low bit rate coded comfort noise output from the first comfort noise generator 21 or the coded speech signal output from the selector 20.

The assignment controller 4, selectors 20, 22 and 32 and multiplexer 6 constitute a speech signal output means.

Next, the operation of the present embodiment 1 will be described.

Figure 12:
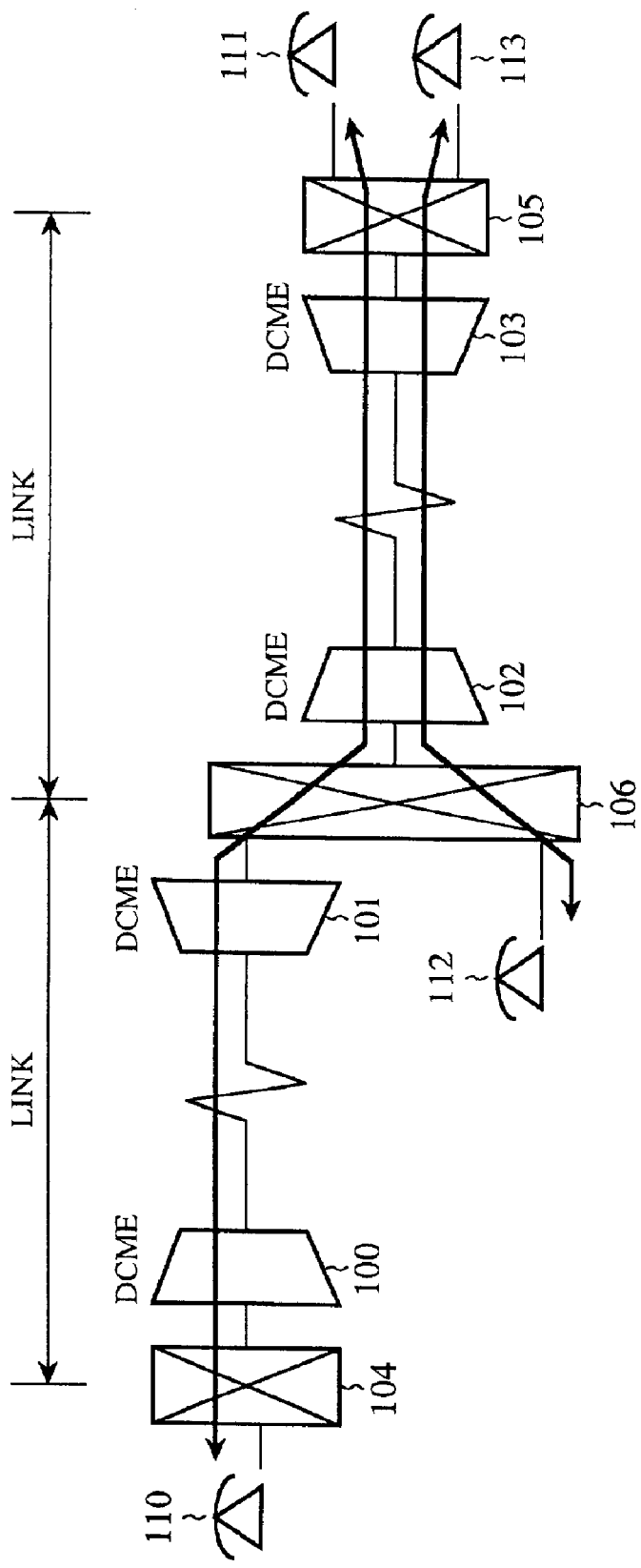
FIG. 12 is a block diagram showing a configuration of a network system.

For example, the operation of the variable bit rate DCMEs with transmission bit rates of 8 kbits/s and 6.4 kbits/s will be described (it is assumed here that the bearer line interconnecting the DCME 100 and DCME 101 as shown in FIG. 12 is assigned 8-kbit/s or 6.4-kbits/s transmission bit rate).

The pseudo-speech signal generator 11 of the DCME 101 as shown in FIG. 12 adds 56-kbit/s dummy data to the coded speech signal when the demultiplexer 7 outputs an 8-kbit/s coded speech signal. In contrast, when the demultiplexer 7 outputs a 6.4-kbit/s coded speech signal, it adds 57.6-kbit/s dummy data to the coded speech signal. Thus, it generates a pseudo-speech signal with a 64-kbit/s transmission bit rate.

When the pseudo-speech signal generator 11 generates the pseudo-speech signal with the 64-kbit/s transmission bit rate, the pseudo-speech signal control information inserting section 33 inserts the pseudo-speech signal control information such as speech activity/silence information and coding bit rate information into the pseudo-speech signal. In other words, it replaces a part of the dummy data added by the pseudo-speech signal generator 11 by the pseudo-speech signal control information. The replacement is carried out by replacing the data at a predetermined position by data with a predetermined pattern. For example, the speech activity/silence information indicating the speech activity or silence is stored in the nth bit of the dummy data, and the coding bit rate information is stored from the (n+1)th bit. Incidentally, the pseudo-speech signal control information is not limited to the above. For example, it can consist of a single data pattern representing a combination of the speech activity/silence information and the coding bit rate information.

On the other hand, the transmission bit rate restorer 19 in the DCME 102 of FIG. 12 eliminates the 56-kbit/s dummy data from the pseudo-speech signal sent from the circuit switch side, thereby converting the pseudo-speech signal to the coded speech signal with the original coding bit rate.

When the original coding bit rate is 6.4 kbits/s, the coding bit rate information adding section 30 adds bit rate identification information (information indicating that the coding bit rate is 6.4 kbits/s) to the coded speech signal extracted by the transmission bit rate restorer 19 to convert it to the coded speech signal with the 8-kbit/s transmission bit rate.

FIG. 15 is a diagram illustrating the coded speech signal output from the transmission bit rate restorer 19. FIG. 15(a) illustrates one frame of the coded speech signal with a transmission rate of 8 kbit/s. The frame consists of LP (line spectrum pairs), P1 and P2 (adaptive codebook), P0 (parity), C1 and C2 (fixed codebook) and G1 and G2 (codebook gains), which amount to 80 bits. On the other hand, FIG. 15(b) illustrates one frame of the coded speech signal with a transmission rate of 6.4 kbit/s. It has a frame structure similar to that of FIG. 15(a), except that C1 and C2 are reduced from 17 bits to 11 bits, each. Thus, their data amount is reduced as compared with that of FIG. 15(a) with the transmission rate of 8 kbit/s.

The coding bit rate information adding section 30 adds the bit rate identification information to the 6.4 kbit/s. For example, a frame consisting of 80 bits is created by inserting 16-bit bit rate identification information S1 ("1111 1111 1111 1111", for example) between the LP and P1 as illustrated in FIG. 15(c). The position of inserting the bit rate identification information S1 is not limited to this position. For example, it can be inserted at any of the initial, middle or final position of the frame. Besides, the 16-bit data can be any data as long as it can be identified.

The pseudo-speech signal control information extracting section 31 extracts the pseudo-speech signal control information such as the speech activity/silence information and coding bit rate information, and supplies it to the assignment controller 4. The pseudo-speech signal control information is extracted by reading data from a predetermined position of the dummy data.

Thus, referring to the coding bit rate information to find that the trunk channel in the passthrough state is in the speech activity state, the assignment controller 4 supplies the message generator 5 and multiplexer 6 with a command to assign 8 kbits/s to the bearer line.

When the transmission bit rate of the coded speech signal contained in the pseudo-speech signal is 8 kbits/s, the assignment controller 4 supplies the selector 32 with a command to select the coded speech signal output from the transmission bit rate restorer 19.

When the channel in the passthrough state is in the silent state, no assignment to the bearer line is carried out.

In the DCME 103 of FIG. 12, the speech decoder 9 decodes the coded speech signal, and supplies the PCM signal to the circuit switch 105.

In this case, even when the speech decoder 9 receives the 8-kbit/s coded speech signal, if it includes the bit rate identification information (information indicating that the coding bit rate is 6.4 kbits/s), the speech decoder 9 carries out 6.4-kbit/s decoding. In contrast, when the coded speech signal includes no bit rate identification information, it carries out 8-kbit/s decoding.

The operation of the foregoing DCMEs will now be described on the path from the telephone 110 to the telephone 111 as shown in FIG. 12.

When the DCME 100 transmits an 8-kbit/s coded speech signal to the DCME 101, the DCME 101 adds the dummy data including the pseudo-speech signal control information to the 8-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, assigns the trunk channel to the bearer line for the DCME 103 at a bit rate of 8 kbits/s, and supplies the bearer line with the coded speech signal with the coding bit rate information, which is output from the coding bit rate information adding section 30. In other words, the assignment controller 4 controls the selector 32 such that the selector 32 outputs the output data of the coding bit rate information adding section 30 in response to the coding bit rate information in the dummy data.

Thus, the bearer line for the DCME 103 is assigned the transmission bit rate of 8 kbits/s, so that it transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

In contrast, when the DCME 100 transmits a 6.4-kbit/s coded speech signal to the DCME 101, the DCME 101 adds the dummy data including the pseudo-speech signal control information to the 6.4-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, assigns the trunk channel to the bearer line for the DCME 103 at a bit rate of 8 kbits/s, and supplies the bearer line with the coded speech signal with coding bit rate information output from the coding bit rate information adding section 30.

Thus, the bearer line for the DCME 103 is assigned the transmission bit rate of 8 kbits/s, so that it transmits the 8-kbit/s signal consisting of the 6.4-kbit/s coded speech signal plus the coding bit rate information.

The DCME 103 recognizes the 6.4-kbit/s coded speech signal from the coding bit rate information added to the 8-kbit/s signal, decodes it into a 64-kbit/s PCM signal, and supplies the PCM signal to the telephone 111 via the circuit switch 105.

In this way, the assignment to the bearer line in the second link on the tandem passthrough is carried out at 8 kbits/s. In this case, when the coded speech signal is 6.4 kbits/s, the information indicating that the coding bit rate is 6.4 kbits/s is added to the 6.4-kbit/s coded speech signal to handle it as the signal with the 8-kbit/s transmission bit rate. Thus, the present embodiment 1 can implement high quality transmission without degrading the speech quality in the variable bit rate DCME with the tandem passthrough function.

Embodiment 2

Figure 2:
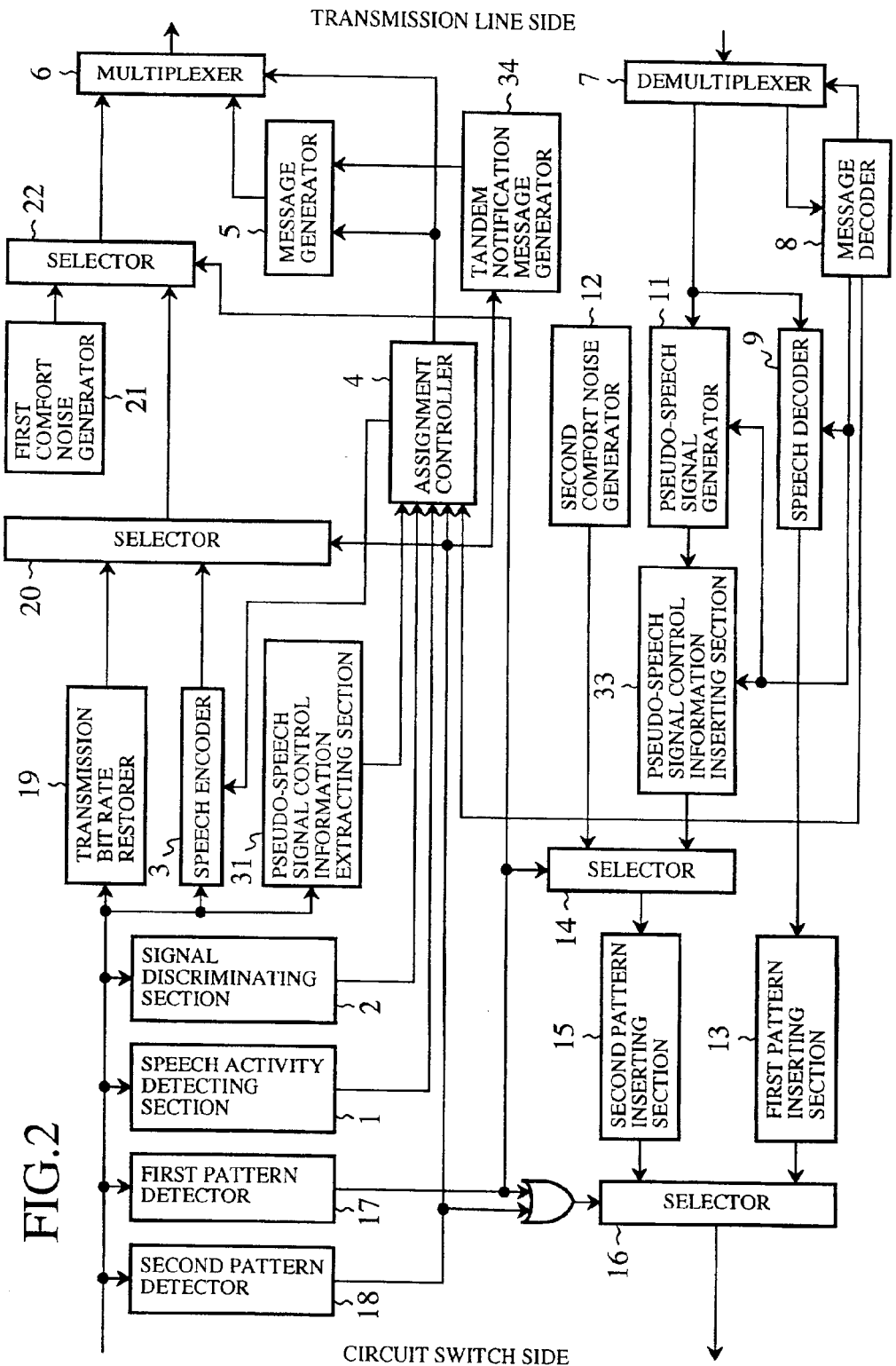
FIG. 2 is a block diagram showing a configuration of an embodiment 2 of the digital circuit multiplication equipment in accordance with the present invention.

FIG. 2 is a block diagram showing a configuration of an embodiment 2 of the digital circuit multiplication equipment in accordance with the present invention. In FIG. 2, the same reference numerals designate the same or like portions to those of FIG. 1, and hence the description thereof is omitted here.

In FIG. 2, the reference numeral 34 designates a tandem notification message generator (message notifying means) for supplying the bearer line with a message indicating trunk channels in a passthrough operation state. Receiving the message from the tandem notification message generator 34 of the party DCME, the assignment controller 4 constituting a bit rate fixing means fixes the transmission bit rate of the coded speech signal of the trunk channel indicated by the message, by setting the coding bit rate assigned to the trunk channel at 8 kbits/s.

Next, the operation of the present embodiment 2 will be described.

For example, the operation of the variable bit rate DCMEs with transmission bit rates of 8 kbits/s and 6.4 kbits/s will be described.

When the tandem notification message generator 34 in the DCME 101 in FIG. 12 is supplied with the second pattern detection signal indicating that the trunk channel enters the passthrough state from the second pattern detector 18, it generates a message for notifying the party DCME of the start of the passthrough operation of the trunk channel.

The message is supplied to the multiplexer 6 from the message generator 5 to be output to the bearer line and sent to the party DCME 100.

The assignment controller 4 in the DCME 100, receiving the message via the demultiplexer 7 and message decoder 8, carries out control such that it assigns only the coding bit rate of 8 kbits/s to the trunk channel indicated by the message without assigning the coding bit rate of 6.4 kbits/s, through the DSI processing is carried out as before.

As described before in connection with FIG. 11, each message consists of a combination of the TC number and BC number, and the available BC numbers are from 1 to 248. In view of this, the BC number 249 is used as the passthrough operation start message. For example, a message TC number=n and BC number=249 means that the trunk channel n starts the passthrough operation. The BC number=250 is used as a pass through operation end message.

When the tandem notification message generator 34 receives a second pattern non-detection signal indicating that the passthrough state of the trunk channel is released from the second pattern detector 18, it outputs a message indicating the end of the passthrough operation. Receiving the message indicating the end of the passthrough operation, the assignment controller 4 of the party DCME returns to its normal operation.

The operation of the DCMEs will now be described on the path from the telephone 110 to the telephone 111 in FIG. 12.

First, when the DCME 101 recognizes that a trunk channel is in the passthrough state, it sends the passthrough start message to the DCME 100.

When the DCME 100 receives the message, the assignment controller 4 controls such that it assigns only the coding bit rate of 8 kbits/s to the trunk channel. Thus, only the 8-kbit/s speech coding is applied to the trunk channel from the DCME 100 to the DCME 101.

The DCME 101 generates the 64-kbit/s pseudo-speech signal by adding dummy data including the pseudo-speech signal control information to the 8-kbit/s coded speech signal, and sends the pseudo-speech signal to the DCME 102 via the circuit switch 106.

The DCME 102, which knows that the trunk channel is in the passthrough state, assigns the trunk channel to the bearer line for the DCME 103 at the bit rate of 8 kbits/s, and selects and outputs the coded speech signal output from the transmission bit rate restorer 19.

As a result, the bearer line for the DCME 103 is assigned the 8-kbit/s transmission bit rate, and transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

In this way, the present embodiment 2 notifies the party DCME 100 that the trunk channel is in the tandem passthrough state, and the party DCME controls such that the trunk channel is brought into the fixed bit rate. Thus, the present embodiment 2 can implement high quality transmission without degrading the speech quality in the variable bit rate DCME with the tandem passthrough function.

Although the non-used BC numbers are utilized as the passthrough operation start and end messages, this is not essential. For example, non-used TC numbers can be utilized instead. Since the number of the trunk channels accommodated by the DCME is 600 channels, the TC numbers= 601 and 602 are not used for the bearer line assignment message. Therefore, the message TC number=601 and BC number=m can indicate that the trunk channel currently connected to the mth BC starts the passthrough operation, whereas the message TC number=602 and BC number=m can indicate that the trunk channel currently connected to the mth BC terminates the passthrough operation, offering a similar advantage to that described above.

Embodiment 3

Figure 3:
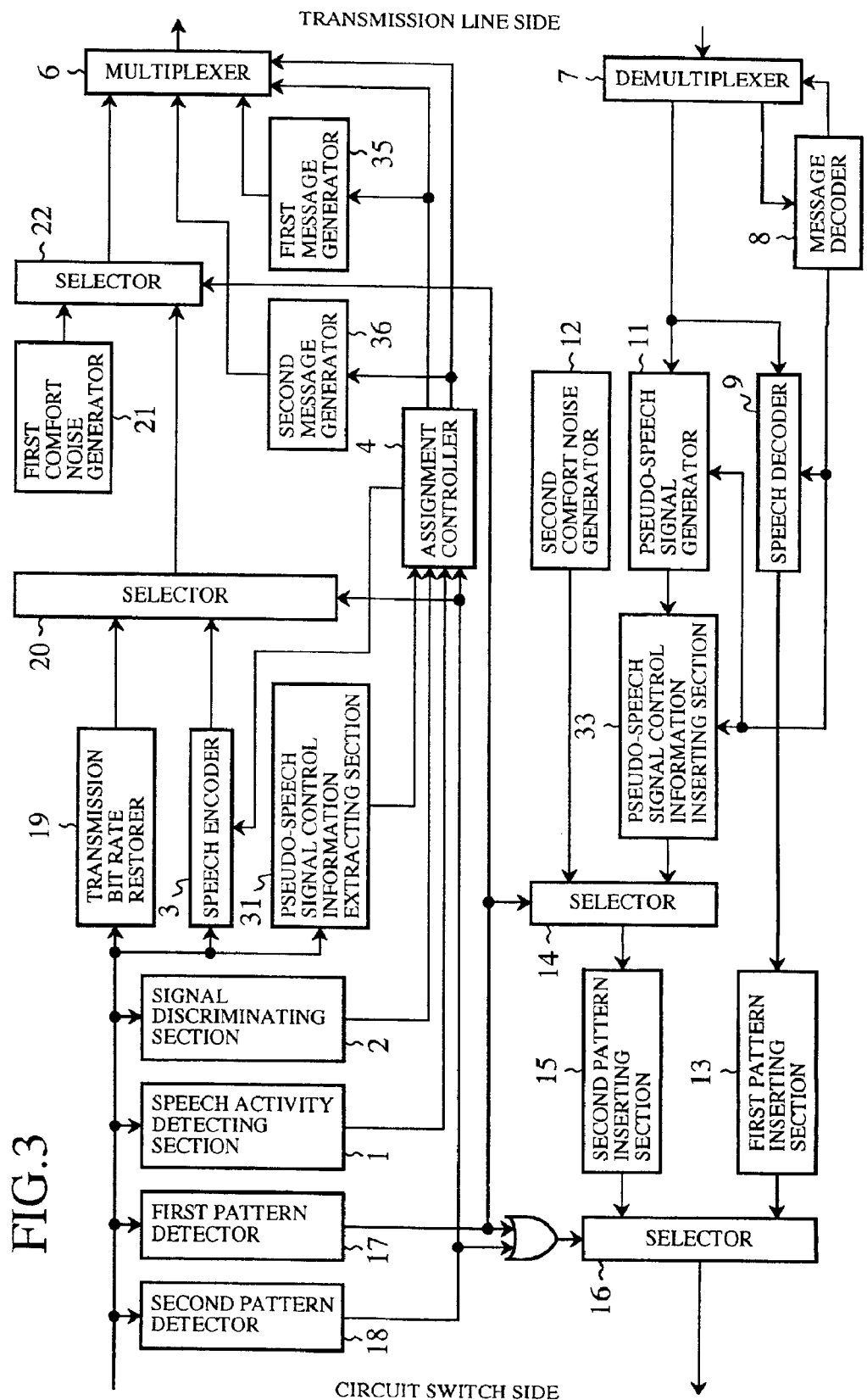
FIG. 3 is a block diagram showing a configuration of an embodiment 3 of the digital circuit multiplication equipment in accordance with the present invention.

FIG. 3 is a block diagram showing a configuration of an embodiment 3 of the digital circuit multiplication equipment in accordance with the present invention. In FIG. 3, the same reference numerals designate the same or like portions to those of FIG. 1, and hence the description thereof is omitted here.

In FIG. 3, the reference numeral 35 designates a first message generator for carrying out message processing onto a first clique, and 36 designates a second message generator for carrying out message processing onto a second clique.

Next, the operation of the present embodiment 3 will be described.

For example, the operation of the variable bit rate DCMEs with transmission bit rates of 8 kbits/s and 6.4 kbits/s will be described.

The assignment controller 4, receiving the second pattern detection signal indicating that a particular trunk channel enters the passthrough state from the second pattern detector 18, recognizes that the trunk channel starts the passthrough operation, and supplies the second message generator 36 and multiplexer 6 with a command to assign the trunk channel to a second clique (passthrough clique).

Figure 4:
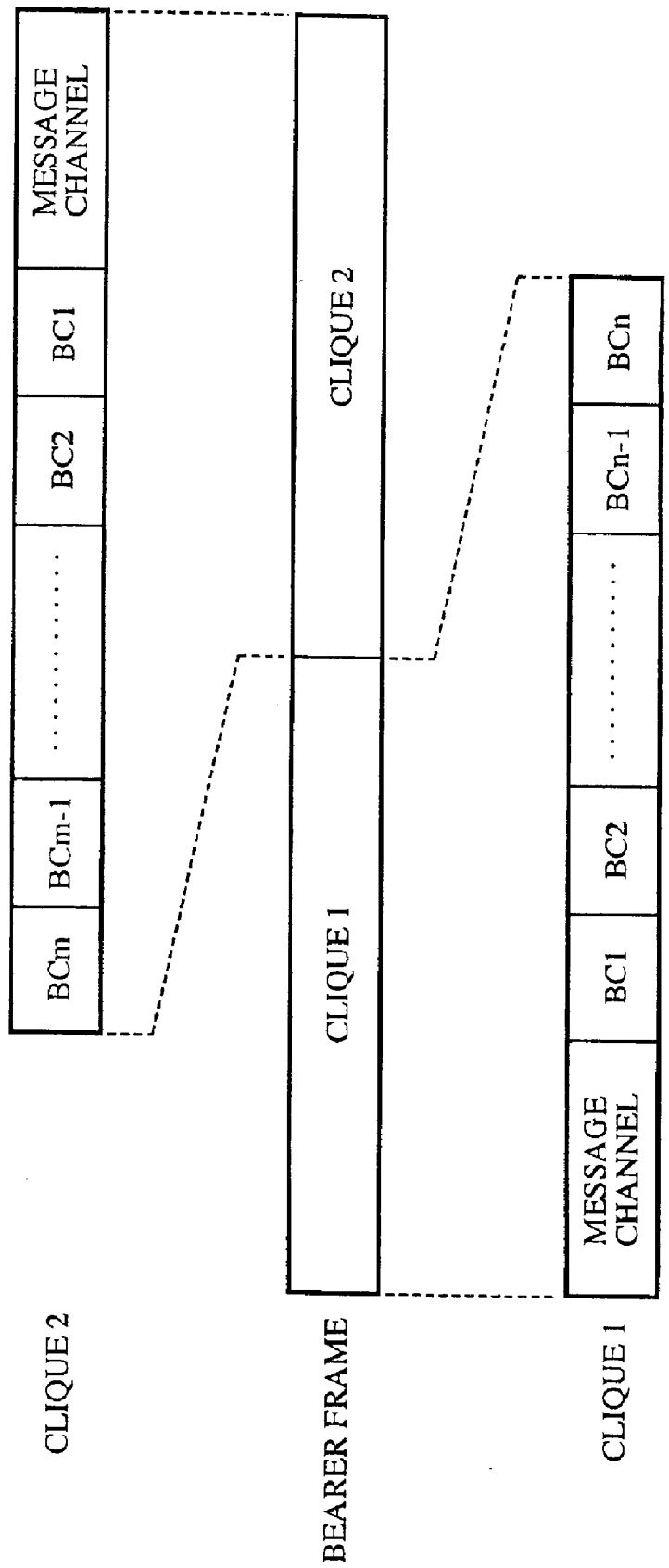
FIG. 4 is a schematic diagram illustrating structures of cliques.
Figure 11:
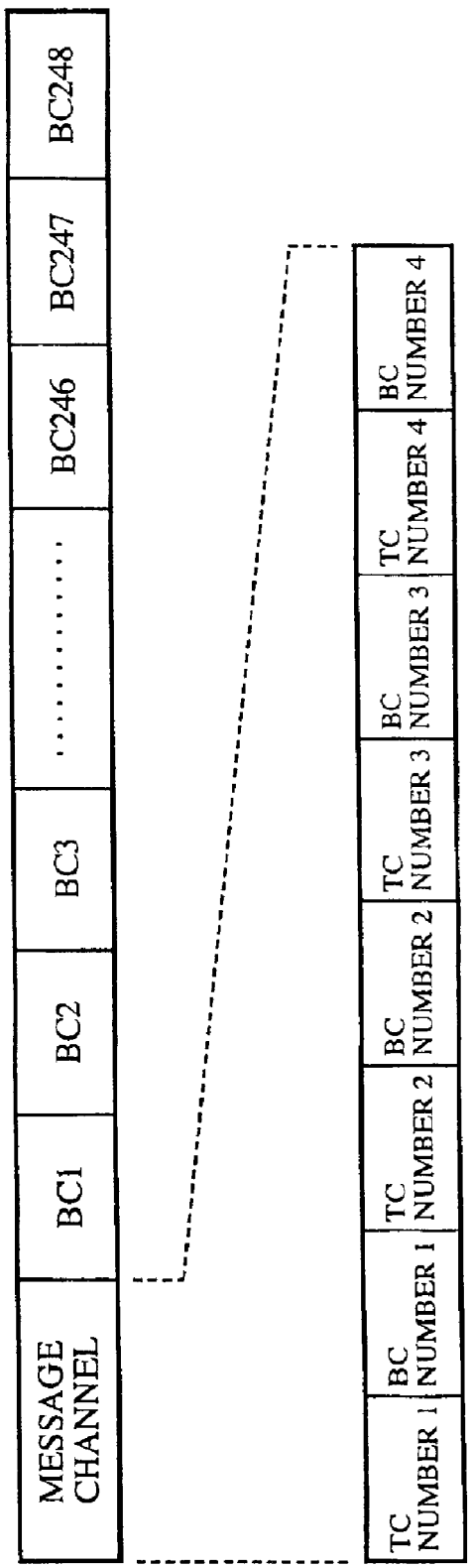
FIG. 11 is a schematic diagram illustrating a frame structure of a signal a DCME supplies to a bearer line.

Thus, the coded speech signal on the trunk channel is transmitted to the party DCME through the second clique. Here, the clique refers to a series of data sequences each consisting of the message channel and bearer channels as illustrated in FIG. 11. The detail of the clique is described in the ITU-T recommendation G.763. Using the second clique means that two cliques share a single bearer line. For example, it can be implemented as illustrated in FIG. 4, where the first clique utilizes a bearer frame from its initial position, whereas the second clique utilizes it from its final position. The DCME that receives the two cliques decodes the message of each clique, and allots the data on the bearer channel to the trunk channels in accordance with the decoded message.

The operation of the foregoing DCMEs will now be described on the path from the telephone 110 to the telephone 111 as shown in FIG. 12.

When the DCME 100 transmits an 8-kbit/s coded speech signal to the DCME 101, the DCME 101 adds the dummy data including the pseudo-speech signal control information to the 8-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, assigns the trunk channel to the second clique on the bearer line for the DCME 103 at a bit rate of 8 kbits/s, and selects and outputs the coded speech signal output from the transmission bit rate restorer 19.

As a result, the trunk channel in the passthrough state is assigned to the bearer line for the DCME 103 at the transmission bit rate of 8 kbits/s, so that the bearer line transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

In contrast, when the DCME 100 transmits a 6.4-kbit/s coded speech signal to the DCME 101, the DCME 101 adds the dummy data including the pseudo-speech signal control information to the 6.4-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, assigns the trunk channel to the second clique on the bearer line for the DCME 103 at a bit rate of 6.4 kbits/s, and selects and outputs the coded speech signal output from the transmission bit rate restorer 19.

As a result, the trunk channel in the passthrough state is assigned to the bearer line for the DCME 103 at the transmission bit rate of 6.4-kbit/s, so that the bearer line transmits the 6.4-kbit/s coded speech signal.

The DCME 103 decodes the 6.4-kbit/s coded speech signal into a 64-kbit/s PCM signal, and supplies the PCM signal to the telephone 111 via the circuit switch 105.

Thus transmitting the trunk channel in the tandem passthrough state by the second clique enables the assignment, which is required by the speech coding information and speech activity/silence information sent from the first link, to be implemented without detaining the request. Thus, the present embodiment 3 can implement high quality transmission without degrading the speech quality in the variable bit rate DCME with the tandem passthrough function.

Embodiment 4

Figure 5:
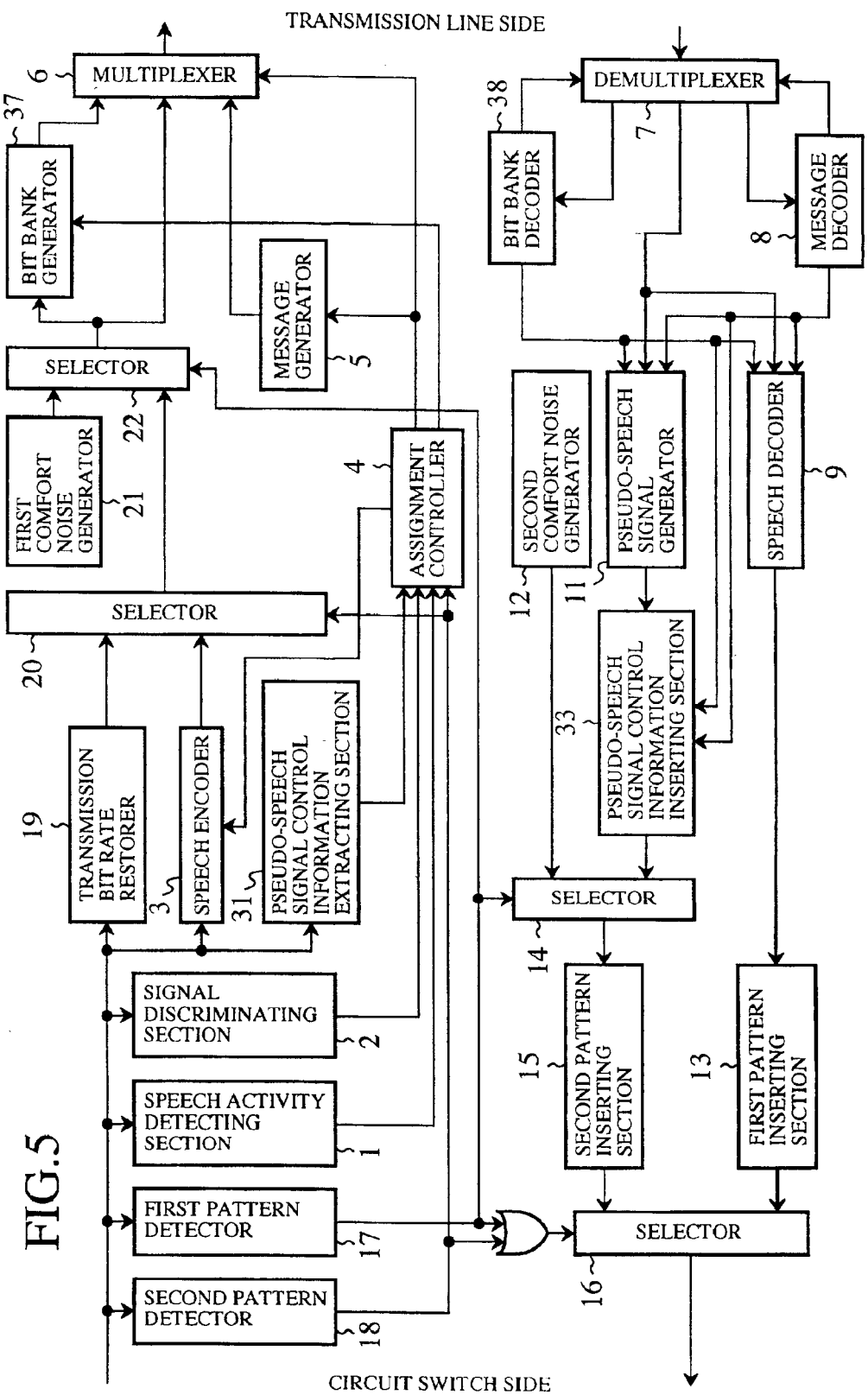
FIG. 5 is a block diagram showing a configuration of an embodiment 4 of the digital circuit multiplication equipment in accordance with the present invention.

FIG. 5 is a block diagram showing a configuration of an embodiment 4 of the digital circuit multiplication equipment in accordance with the present invention. In FIG. 5, the same reference numerals designate the same or like portions to those of FIG. 1, and hence the description thereof is omitted here.

In FIG. 5, the reference numeral 37 designates a bit bank generator for generating a bit bank; and 38 designates a bit bank decoder for decoding the data sequence in the bit bank, and for controlling the demultiplexer 7, speech decoder 9, pseudo-speech signal generator 11 and pseudo-speech signal control information inserting section 33 in the same manner as controlling the message decoder 8, for the data in the bit bank.

Next, the operation of the present embodiment 4 will be described.

For example, the operation of the variable bit rate DCMEs with transmission bit rates of 8 kbits/s and 6.4 kbits/s will be described.

The assignment controller 4, receiving the second pattern detection signal indicating that a particular trunk channel enters the passthrough state from the second pattern detector 18, recognizes that the trunk channel starts the passthrough operation, and supplies the bit bank generator 37 and multiplexer 6 with a command to assign the trunk channel to the bit bank.

Thus, the coded speech signal on the trunk channel is transmitted to the party DCME through the bit bank. Here, the bit bank refers to a series of data sequences that form a dedicated transmission line using a plurality of bearer channels as illustrated in FIG. 11, and transmits the target data therein. The detail of the clique is described in the ITU-T recommendation G.763. A single bit bank can transmit data of a plurality of trunk channels. For example, a 40-kbit/s bit bank using five 8-kbit/s bearer channels can transmit four channel 10-kbit/s data sequences, each consisting of an 8-kbit/s coded speech signal and 2-kbit/s control information.

To increase or decrease the capacity of the bit bank, the assignment message to the DCME is used. Reserving a large capacity bit bank in advance can facilitate the assignment of the passthrough channels to the bit bank. In the DCME that receives the bit bank, the demultiplexer 7 supplies the bit bank data to the bit bank decoder 38 according to the decoded result by the message decoder 8, and delivers the coded speech signal of each trunk channel to the speech decoder 9 and pseudo-speech signal generator 11 of the trunk channel according to the decoded result by the bit bank decoder 38. As for the message decoding of the bit band decoder 38, and the control of the speech decoder 9 and the like, the well-known method and control can be utilized which are similar to the decoding method of the bit bank decoder 38 and the control method.

The operation of the foregoing DCMEs will now be described on the path from the telephone 110 to the telephone 111 as shown in FIG. 12.

When the DCME 100 transmits an 8-kbit/s coded speech signal to the DCME 101, the DCME 101 adds the dummy data including the pseudo-speech signal control information to the 8-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, assigns the trunk channel to the bit bank on the bearer line for the DCME 103, and selects and outputs the coded speech signal output from the transmission bit rate restorer 19. Here, the assignment controller 4 assigns the trunk channel to the bit bank, and controls the bit bank generator 37 such that the bit bank generator 37 generates the bit bank by using the data of the trunk channel. As for generating the bit bank, the well-known technique described in the ITU-T recommendation G.763 can be utilized.

As a result, the trunk channel in the passthrough state is assigned to the bit bank on the bearer line for the DCME 103, so that the bit bank transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

In contrast, when the DCME 100 transmits a 6.4-kbit/s coded speech signal to the DCME 101, the DCME 101 adds the dummy data including the pseudo-speech signal control information to the 6.4-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, assigns the trunk channel to the bit bank on the bearer line for the DCME 103, and selects and outputs the coded speech signal output from the transmission bit rate restorer 19.

As a result, the trunk channel in the passthrough state is assigned to the bit bank on the bearer line for the DCME 103, so that the bit bank transmits the 6.4-kbit/s coded speech signal.

The DCME 103 decodes the 6.4-kbit/s coded speech signal into a 64-kbit/s PCM signal, and supplies the PCM signal to the telephone 111 via the circuit switch 105.

Thus transmitting the trunk channel in the tandem passthrough state by the bit bank collecting the data of the tandem passthrough channels enables the assignment, which is required by the speech coding information and speech activity/silence information sent from the first link, to be implemented without detaining the request. Thus, the present embodiment 4 can implement high quality transmission without degrading the speech quality in the variable bit rate DCME with the tandem passthrough function.

Embodiment 5

Figure 6:
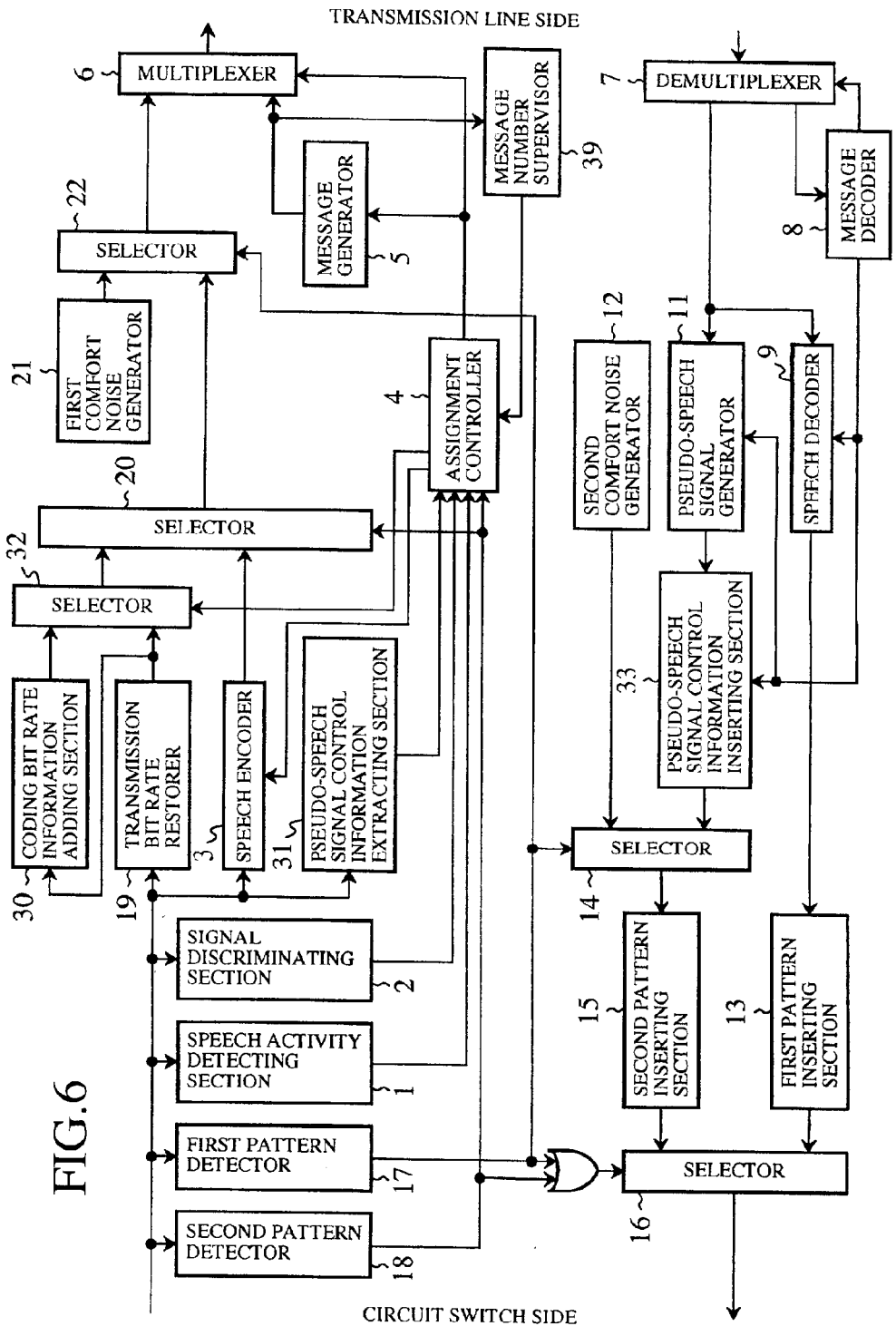
FIG. 6 is a block diagram showing a configuration of an embodiment 5 of the digital circuit multiplication equipment in accordance with the present invention.

FIG. 6 is a block diagram showing a configuration of an embodiment 5 of the digital circuit multiplication equipment in accordance with the present invention. In FIG. 6, the same reference numerals designate the same or like portions to those of FIG. 1, and hence the description thereof is omitted here.

In FIG. 6, the reference numeral 39 designates a message number supervisor for supervising the number of messages generated by the message generator 5.

Next, the operation of the present embodiment 5 will be described.

For example, the operation of the-variable bit rate DCMEs with transmission bit rates of 8 kbits/s and 6.4 kbits/s will be described.

The message number supervisor 39 monitors the number of messages generated by the message generator 5. When the number of messages is small, the load on the DCME is light, and hence the assignment to the bearer line, which is requested by the speech coding bit rate information and speech activity/silence information sent from the first link, can be carried out without detaining the request. However, when the number of messages generated is large, the load on the DCME is heavy, and hence the request is not always carried out soon.

In view of this, the message number supervisor 39 has a particular threshold value, and when the number of message generated exceeds the threshold value, it supplies the assignment controller 4 with a command to assign the passthrough state trunk channel to the bearer line at 8 kbits/s in the second link as in the foregoing embodiment 1. In contrast, when the number of messages generated is equal to or less than the threshold value, it provides the assignment controller 4 with a command to assign the bit rate of 8 kbits/s or 6.4 kbits/s to the bearer line in accordance with the request from the first link.

The operation of the foregoing DCMEs will now be described on the path from the telephone 110 to the telephone 111 as shown in FIG. 12.

When the DCME 100 transmits an 8-kbit/s coded speech signal to the DCME 101, the DCME 101 adds the dummy data including the pseudo-speech signal control information to the 8-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, has the assignment controller 4 decide the transmission bit rate to be assigned to the bearer line in accordance with the supervisory result of the message number supervisor 39.

When the number of messages is equal to or less than the threshold value, the assignment controller 4 decides the transmission bit rate to be assigned to the bearer-line in accordance with the information output from the pseudo-speech signal control information extracting section 31. In this case, since the information output from the pseudo-speech signal control information extracting section 31 indicates that the coded speech signal included in the pseudo-speech signal of the trunk channel is 8 kbits/s, the assignment controller 4 assigns the 8 kbits/s to the bearer line. In addition, it controls such that the coded speech signal output from the transmission bit rate restorer 19 is selected and output.

As a result, the bearer line for the DCME 103 is assigned the transmission bit rate of 8 kbits/s, so that it transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

When the number of messages exceeds the threshold value, the assignment controller 4 always assigns the trunk channel to the bearer line for the DCME 103 at the bit rate of 8 kbits/s without considering the information output from the pseudo-speech signal control information extracting section 31, and controls such that the coded speech signal output from the transmission bit rate restorer 19 is selected and output.

As a result, the bearer line for the DCME 103 is assigned the transmission bit rate of 8 kbits/s, so that it transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

In contrast, when the DCME 100 transmits a 6.4-kbit/s coded speech signal to the DCME 101, the DCME 101 adds the dummy data including the pseudo-speech signal control information to the 6.4-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, has the assignment controller 4 decide the transmission bit rate to be assigned to the bearer line in accordance with the supervisory result of the message number supervisor 39.

When the number of messages is equal to or less than the threshold value, the assignment controller 4 decides the transmission bit rate to be assigned to the bearer line in accordance with the information output from the pseudo-speech signal control information extracting section 31. In this case, since the information output from the pseudo-speech signal control information extracting section 31 indicates that the coded speech signal included in the pseudo-speech signal of the trunk channel is 6.4 kbits/s, the assignment controller 4 assigns the 6.4 kbits/s to the bearer line. In addition, it controls such that the coded speech signal output from the transmission bit rate restorer 19 is selected and output.

As a result, the bearer line for the DCME 103 is assigned the transmission bit rate of 6.4 kbits/s, so that it transmits the 6.4-kbit/s coded speech signal.

The DCME 103 decodes the 6.4-kbit/s coded speech signal into a 64-kbit/s PCM signal, and supplies the PCM signal to the telephone 111 via the circuit switch 105.

When the number of messages exceeds the threshold value, the assignment controller 4 always assigns the trunk channel to the bearer line for the DCME 103 at the bit rate of 8 kbits/s without considering the information output from the pseudo-speech signal control information extracting section 31, and controls such that the coded speech signal output from the coding bit rate information adding section 30 is selected and output.

As a result, the bearer line for the DCME 103 is assigned the transmission bit rate of 8 kbits/s, so that it transmits the 8-kbit/s signal including the 6.4-kbit/s coded speech signal plus the coding bit rate information.

The DCME 103 recognizes the 6.4-kbit/s coded speech signal from the coding bit rate information added to the 8-kbit/s signal, decodes it into a 64-kbit/s PCM signal, and supplies the PCM signal to the telephone 111 via the circuit switch 105.

Thus controlling the bit rate assigned to the bearer line in the second link in accordance with the number of messages generated, the present embodiment 5 can implement high quality and low bit rate transmission without degrading the speech quality in the variable bit rate DCME with the tandem passthrough function.

Embodiment 6

Figure 7:
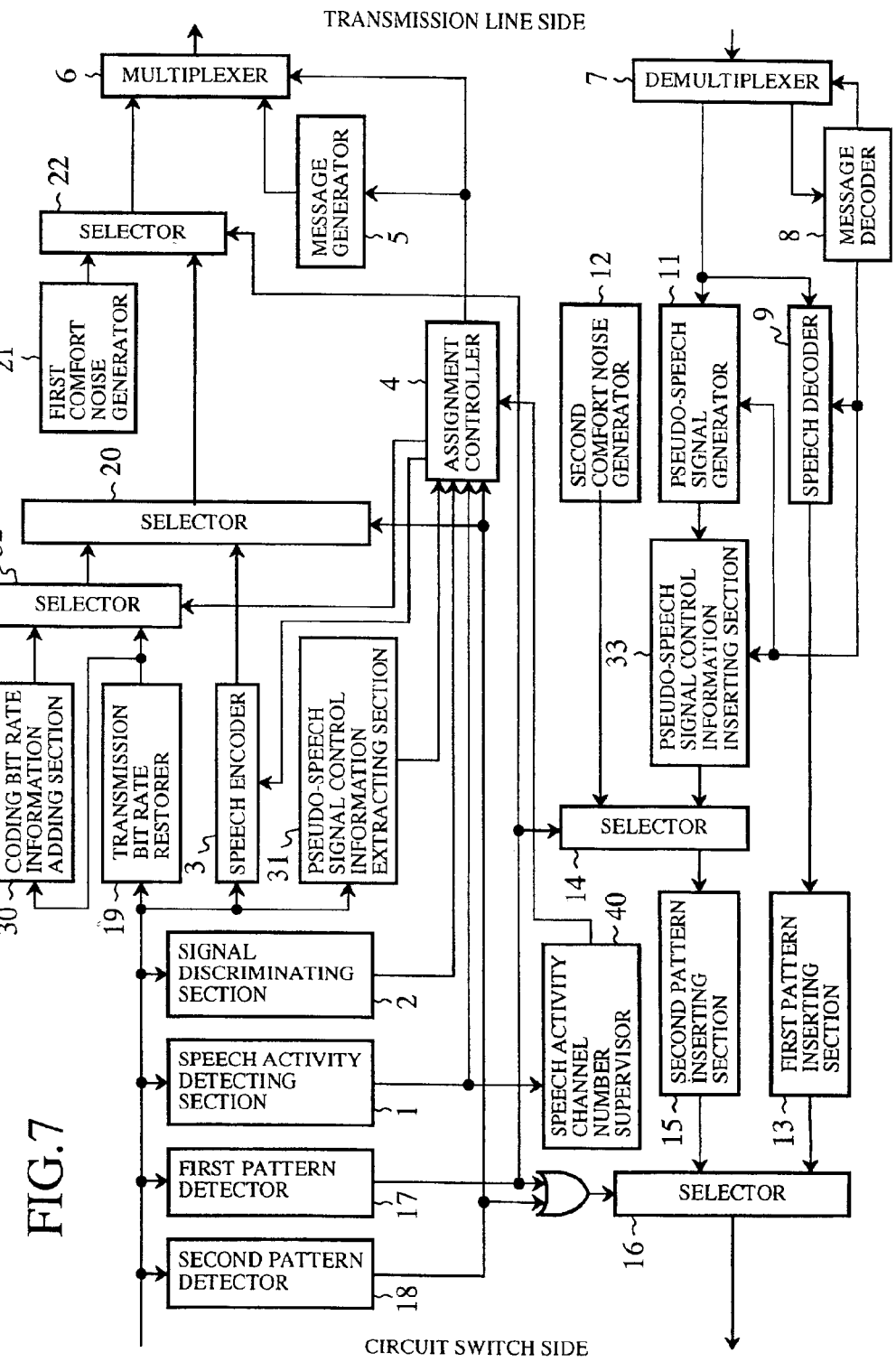
FIG. 7 is a block diagram showing a configuration of an embodiment 6 of the digital circuit multiplication equipment in accordance with the present invention.

FIG. 7 is a block diagram showing a configuration of an embodiment 6 of the digital circuit multiplication equipment in accordance with the present invention. In FIG. 7, the same reference numerals designate the same or like portions to those of FIG. 1, and hence the description thereof is omitted here.

In FIG. 7, the reference numeral 40 designates a speech activity channel number supervisor for monitoring the number of trunk channels in the speech active state.

Next, the operation of the present embodiment 6 will be described.

For example, the operation of the variable bit rate DCMEs with transmission bit rates of 8 kbits/s and 6.4 kbits/s will be described.

The speech activity channel number supervisor 40 monitors the number of the trunk channels in the speech active state in accordance with the decision result by the speech activity detecting section 1. When the number of the trunk channels in the speech active state is small, the load on the DCME is light, and hence the assignment to the bearer line, which is requested by the speech coding bit rate information and speech activity/silence information sent from the first link, can be carried out without detaining the request. On the other hand, when the number of the trunk channels in the speech active state is large, the load on the DCME is heavy, and hence the request is not always carried out soon.

In view of this, the speech activity channel number supervisor 40 has a particular threshold value, and when the number of the trunk channels in the speech active state exceeds the threshold value, it supplies the assignment controller 4 with a command to assign the passthrough state trunk channel to the bearer line at 8 kbits/s in the second link as in the foregoing embodiment 1. In contrast, when the number of the trunk channels in the speech active state is equal to or less than the threshold value, it provides the assignment controller 4 with a command to assign the bit rate of 8 kbits/s or 6.4 kbits/s to the bearer line in accordance with the request from the first link.

The operation of the foregoing DCMEs will now be described on the path from the telephone 110 to the telephone 111 as shown in FIG. 12.

When the DCME 100 transmits an 8-kbit/s coded speech signal to the DCME 101, the DCME 101 adds the dummy data including the pseudo-speech signal control information to the 8-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, has the assignment controller 4 decide the transmission bit rate to be assigned to the bearer line in accordance with the supervisory result of the speech activity channel number supervisor 40.

When the number of the trunk channels in the speech active state is equal to or less than the threshold value, the assignment controller 4 decides the transmission bit rate to be assigned to the bearer line in accordance with the information output from the pseudo-speech signal control information extracting section 31. In this case, since the information output from the pseudo-speech signal control information extracting section 31 indicates that the coded speech signal included in the pseudo-speech signal of the trunk channel is 8 kbits/s, the assignment controller 4 assigns the 8 kbits/s to the bearer line. In addition, it controls such that the coded speech signal output from the transmission bit rate restorer 19 is selected and output.

As a result, the bearer line for the DCME 103 is assigned the transmission bit rate of 8 kbits/s, so that it transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

When the number of the trunk channels in the speech active state exceeds the threshold value, the assignment controller 4 always assigns the trunk channel to the bearer line for the DCME 103 at the bit rate of 8 kbits/s without considering the information output from the pseudo-speech signal control information extracting section 31, and controls such that the coded speech signal output from the transmission bit rate restorer 19 is selected and output.

As a result, the bearer line for the DCME 103 is assigned the transmission bit rate of 8 kbits/s, so that it transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

In contrast, when the DCME 100 transmits a 6.4-kbit/s coded speech signal to the DCME 101, the DCME 101 adds the dummy data including the pseudo-speech signal control information to the 6.4-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, has the assignment controller 4 decide the transmission bit rate to be assigned to the bearer line in accordance with the supervisory result of the speech activity channel number supervisor 40.

When the number of the trunk channels in the speech active state is equal to or less than the threshold value, the assignment controller 4 decides the transmission bit rate to be assigned to the bearer line in accordance with the information output from the pseudo-speech signal control information extracting section 31. In this case, since the information output from the pseudo-speech signal control information extracting section 31 indicates that the coded speech signal included in the pseudo-speech signal of the trunk channel is 6.4 kbits/s, the assignment controller 4 assigns the 6.4 kbits/s to the bearer line. In addition, it controls such that the coded speech signal output from the transmission bit rate restorer 19 is selected and output.

As a result, the bearer line for the DCME 103 is assigned the transmission bit rate of 6.4 kbits/s, so that it transmits the 6.4-kbit/s coded speech signal.

The DCME 103 decodes the 6.4-kbit/s coded speech signal into a 64-kbit/s PCM signal, and supplies the PCM signal to the telephone 111 via the circuit switch 105.

When the number of the trunk channels in the speech active state exceeds the threshold value, the assignment controller 4 always assigns the trunk channel to the bearer line for the DCME 103 at the bit rate of 8 kbits/s without considering the information output from the pseudo-speech signal control information extracting section 31, and controls such that the coded speech signal output from the coding bit rate information adding section 30 is selected and output.

As a result, the bearer line for the DCME 103 is assigned the transmission bit rate of 8 kbits/s, so that it transmits the 8-kbit/s signal including the 6.4-kbit/s coded speech signal plus the coding bit rate information.

The DCME 103 recognizes the 6.4-kbit/s coded speech signal from the coding bit rate information added to the 8-kbit/s signal, decodes it into a 64-kbit/s PCM signal, and supplies the PCM signal to the telephone 111 via the circuit switch 105.

Thus controlling the bit rate assigned to the bearer line in the second link in accordance with the number of the trunk channels in the speech activity state, the present embodiment 6 can implement high quality and low bit rate transmission without degrading the speech quality in the variable bit rate DCME with the tandem passthrough function.

Embodiment 7

Figure 8:
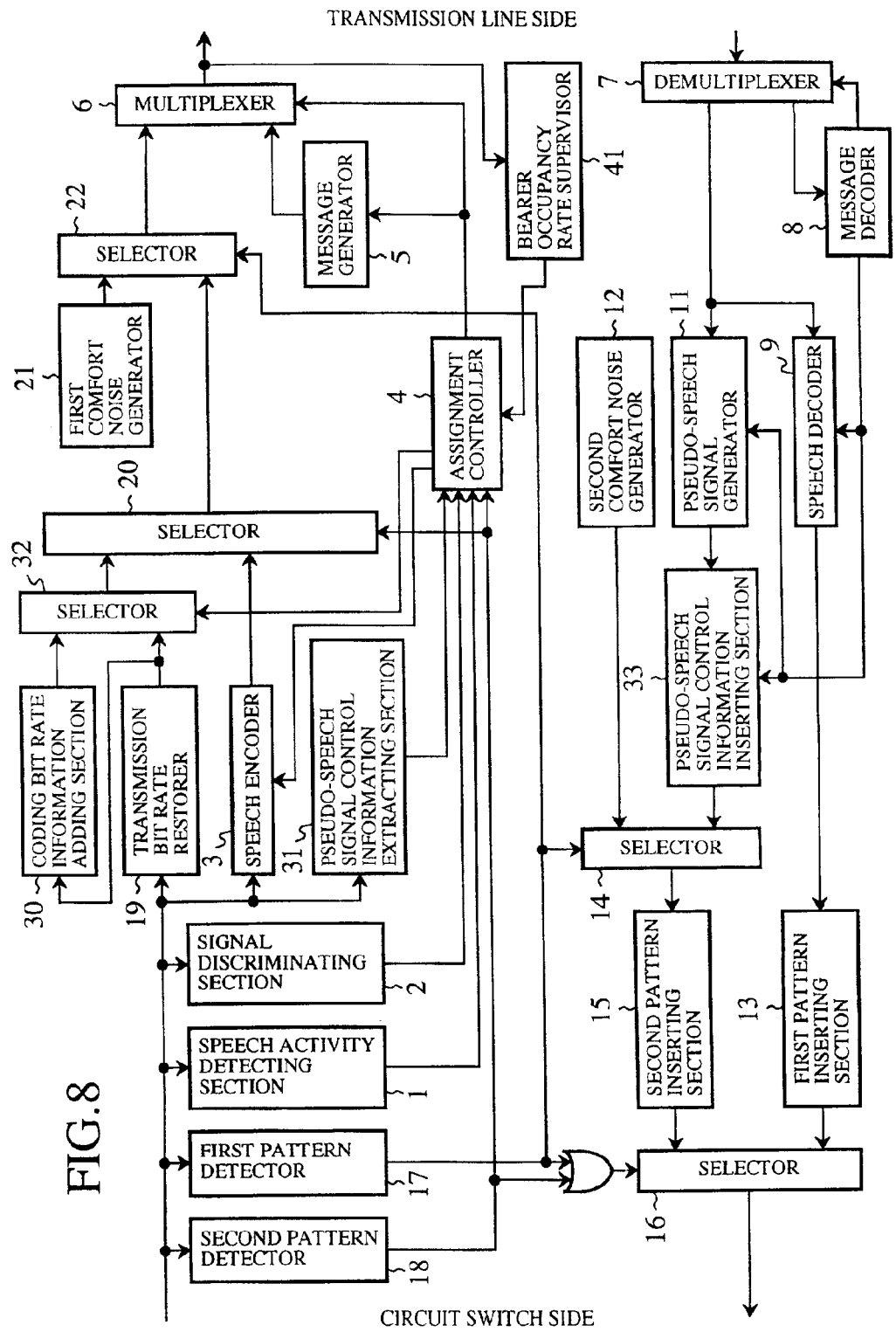
FIG. 8 is a block diagram showing a configuration of an embodiment 7 of the digital circuit multiplication equipment in accordance with the present invention.

FIG. 8 is a block diagram showing a configuration of an embodiment 7 of the digital circuit multiplication equipment in accordance with the present invention. In FIG. 7, the same reference numerals designate the same or like portions to those of FIG. 1, and hence the description thereof is omitted here.

In FIG. 8, the reference numeral 41 designates a bearer occupancy rate supervisor for monitoring the bearer occupancy rate of the bearer line (the rate of the capacity of busy bearer channels to the capacity of the bearer line). Next, the operation of the present embodiment 7 will be described.

For example, the operation of the variable bit rate DCMEs with transmission bit rates of 8 kbits/s and 6.4 kbits/s will be described.

The bearer occupancy rate supervisor 41 monitors the rate of the capacity of the bearer channels that are occupied on the bearer line to the capacity of the bearer line. When the bearer occupancy rate is small, the load on the DCME is light, and hence the assignment to the bearer line, which is requested by the speech coding bit rate information and speech activity/silence information sent from the first link, can be carried out without detaining the request. On the other hand, when the bearer occupancy rate is large, the load on the DCME is heavy, and hence the request is not always carried out soon.

In view of this, the bearer occupancy rate supervisor 41 has a particular threshold value, and when the bearer occupancy rate exceeds the threshold value, it supplies the assignment controller 4 with a command to assign the passthrough state trunk channel to the bearer line at 8 kbits/s in the second link as in the foregoing embodiment 1. In contrast, when the bearer occupancy rate is equal to or less than the threshold value, it provides the assignment controller 4 with a command to assign the bit rate of 8 kbits/s or 6.4 kbits/s to the bearer line in accordance with the request from the first link.

The operation of the foregoing DCMEs will now be described on the path from the telephone 110 to the telephone 111 as shown in FIG. 12.

When the DCME 100 transmits an 8-kbit/s coded speech signal to the DCME 101, the DCME 101 adds the dummy data including the pseudo-speech signal control information to the 8-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, has the assignment controller 4 decide the transmission bit rate to be assigned to the bearer line in accordance with the supervisory result of the bearer occupancy rate supervisor 41.

When the bearer occupancy rate is equal to or less than the threshold value, the assignment controller 4 decides the transmission bit rate to be assigned to the bearer line in accordance with the information output from the pseudo-speech signal control information extracting section 31. In this case, since the information output from the pseudo-speech signal control information extracting section 31 indicates that the coded speech signal included in the pseudo-speech signal of the trunk channel is 8 kbits/s, the assignment controller 4 assigns the 8 kbits/s to the bearer line. In addition, it controls such that the coded speech signal output from the transmission bit rate restorer 19 is selected and output.

As a result, the bearer line for the DCME 103 is assigned the transmission bit rate of 8 kbits/s, so that it transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

When the bearer occupancy rate exceeds the threshold value, the assignment controller 4 always assigns the trunk channel to the bearer line for the DCME 103 at the bit rate of 8 kbits/s without considering the information output from the pseudo-speech signal control information extracting section 31, and controls such that the coded speech signal output from the transmission bit rate restorer 19 is selected and output.

As a result, the bearer line for the DCME 103 is assigned the transmission bit rate of 8 kbits/s, so that it transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

In contrast, when the DCME 100 transmits a 6.4-kbit/s coded speech signal to the DCME 101, the DCME 101 adds the dummy data including the pseudo-speech signal control information to the 6.4-kbit/s coded speech signal, and sends the 64-kbit/s pseudo-speech signal to the circuit switch 106.

Receiving the 64-kbit/s pseudo-speech signal from the circuit switch 106, the DCME 102, which knows that the trunk channel is in the passthrough state, has the assignment controller 4 decide the transmission bit rate to be assigned to the bearer line in accordance with the supervisory result of the bearer occupancy rate supervisor 41.

When the bearer occupancy rate is equal to or less than the threshold value, the assignment controller 4 decides the transmission bit rate to be assigned to the bearer line in accordance with the information output from the pseudo-speech signal control information extracting section 31. In this case, since the information output from the pseudo-speech signal control information extracting section 31 indicates that the coded speech signal included in the pseudo-speech signal of the trunk channel is 6.4 kbits/s, the assignment controller 4 assigns the 6.4 kbits/s to the bearer line. In addition, it controls such that the coded speech signal output from the transmission bit rate restorer 19 is selected and output.

As a result, the bearer line for the DCME 103 is assigned the transmission bit rate of 6.4 kbits/s, so that it transmits the 6.4-kbit/s coded speech signal.

The DCME 103 decodes the 6.4-kbit/s coded speech signal into a 64-kbit/s PCM signal, and supplies the PCM signal to the telephone 111 via the circuit switch 105.

When the bearer occupancy rate exceeds the threshold value, the assignment controller 4 always assigns the trunk channel to the bearer line for the DCME 103 at the bit rate of 8 kbits/s without considering the information output from the pseudo-speech signal control information extracting section 31, and controls such that the coded speech signal output from the coding bit rate information adding section 30 is selected and output.

As a result, the bearer line for the DCME 103 is assigned the transmission bit rate of 8 kbits/s, so that it transmits the 8-kbit/s signal including the 6.4-kbit/s coded speech signal plus the coding bit rate information.

The DCME 103 recognizes the 6.4-kbit/s coded speech signal from the coding bit rate information added to the 8-kbit/s signal, decodes it into a 64-kbit/s PCM signal, and supplies the PCM signal to the telephone 111 via the circuit switch 105.

Thus controlling the bit rate assigned to the bearer line in the second link in accordance with the bearer occupancy rate, the present embodiment 7 can implement high quality and low bit rate transmission without degrading the speech quality in the variable bit rate DCME with the tandem passthrough function.

Embodiment 8

Figure 9:
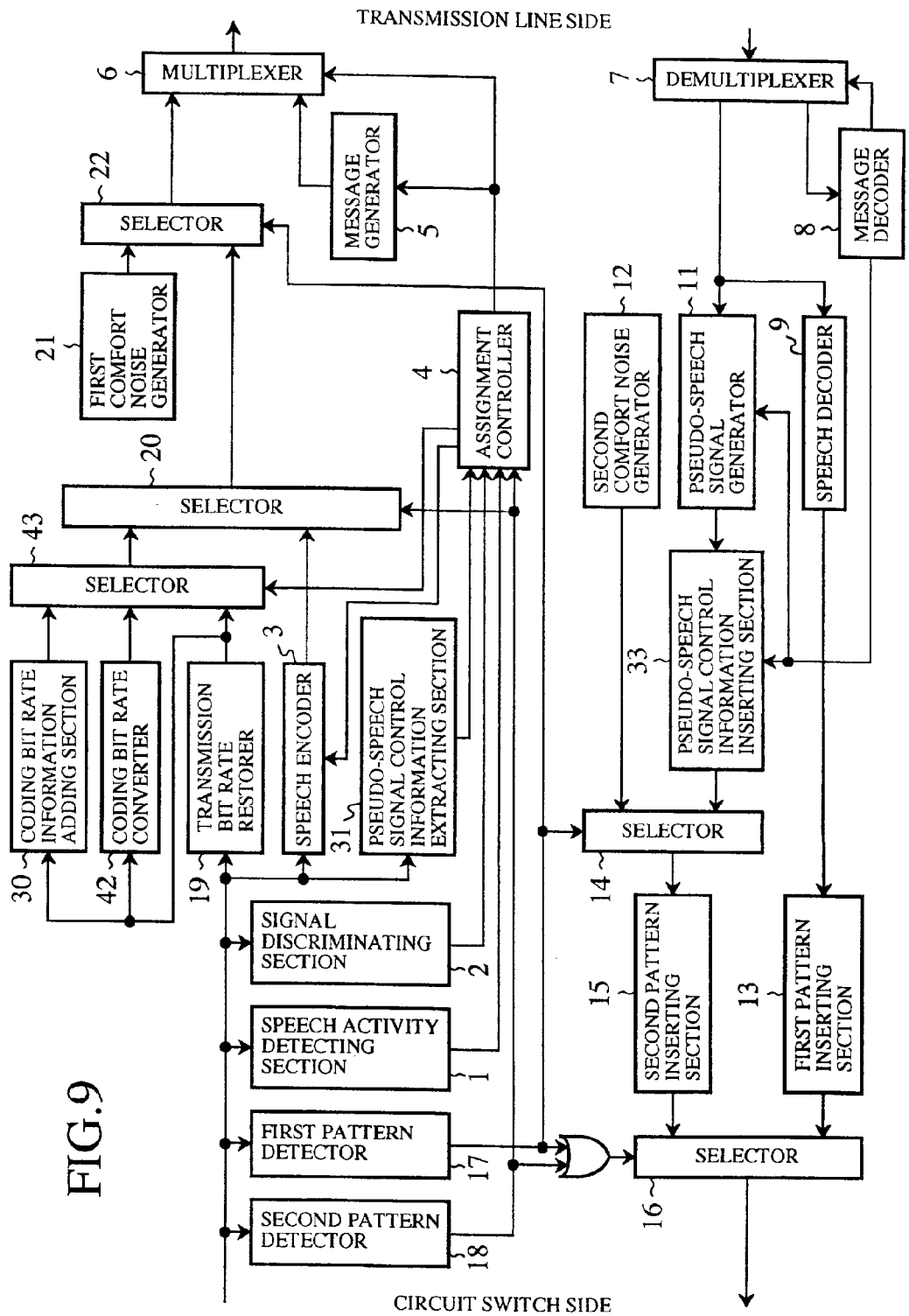
FIG. 9 is a block diagram showing a configuration of an embodiment 8 of the digital circuit multiplication equipment in accordance with the present invention.

FIG. 9 is a block diagram showing a configuration of an embodiment 8 of the digital circuit multiplication equipment in accordance with the present invention. In FIG. 8, the same reference numerals designate the same or like portions to those of FIG. 1, and hence the description thereof is omitted here.

In FIG. 9, the reference numeral 42 designates a coding bit rate converter (information reduction means) for generating a low coding bit rate coded speech signal by removing the information amount of a quantization table and the like from the data sequence of the coded speech signal; and 43 designates a selector (speech signal output means) for selecting and outputting one of the outputs of the transmission bit rate restorer 19, coding bit rate converter 42 and coding bit rate information adding section 30 in accordance with a command from the assignment controller 4.

Next, the operation of the present embodiment 8 will be described.

For example, the operation of the variable bit rate DCMEs with transmission bit rates of 8 kbits/s and 6.4 kbits/s will be described.

The coding bit rate converter 42 generates the low coding bit rate coded speech signal from the data sequence of the coded speech signal by deleting the information such as the quantization table.

When the coded speech signal recovered by the transmission bit rate restorer 19 is 8 kbits/s, the pseudo-speech signal control information extracting section 31 notifies the assignment controller 4 of the fact so that the assignment controller 4 assigns the 8-kbit/s transmission bit rate to the bearer line. In accordance with the command from the assignment controller 4, the selector 43 selects and outputs the coded speech signal supplied from the transmission bit rate restorer 19.

In contrast, when the assignment controller 4 assigns the 6.4-kbit/s transmission bit rate to the bearer line, the selector 43 selects and outputs the coded speech signal output from the coding bit rate converter 42 in accordance with the command from the assignment controller 4.

When the coded speech signal recovered by the transmission bit rate restorer 19 is 6.4 kbits/s, and the pseudo-speech signal control information extracting section 31 notifies the assignment controller 4 of the fact, but the assignment controller 4 assigns the 8-kbit/s transmission bit rate to the bearer line, the selector 43 selects and outputs the coded speech signal supplied from the coding bit rate information adding section 30 in accordance with the command from the assignment controller 4.

On the other hand, when the assignment controller 4 assigns the 6.4-kbit/s transmission bit rate to the bearer line, the selector 43 selects and outputs the coded speech signal output from the transmission bit rate restorer 19 in accordance with the command from the assignment controller 4.

The operation of the foregoing DCMEs will now be described on the path from the telephone 110 to the telephone 111 as shown in FIG. 12.

When the DCME 100 transmits an 8-kbit/s coded speech signal to the DCME 101, the DCME 101 adds the dummy data including the pseudo-speech signal control information to the 8-kbit/s coded speech signal, and sends the 64-kbit/s pseudo-speech signal to the circuit switch 106.

In the DCME 102, the assignment controller 4 decides the transmission bit rate to be assigned to the bearer line in accordance with the load condition on the DCME, for the trunk channel in the passthrough state in the same manner as for the trunk channel in the non-passthrough state.

When the assignment controller 4 assigns 8 kbits/s to the bearer line for the trunk channel, it provides the selector 43 with a command to select and output the coded speech signal output from the transmission bit rate restorer 19.

As a result, the bearer line for the DCME 103 is assigned the transmission bit rate of 8 kbits/s, so that it transmits the 8-kbit/s coded speech signal.

The DCME 103 decodes the 8-kbit/s coded speech signal into a 64-kbit/s PCM signal, and supplies the PCM signal to the telephone 111 via the circuit switch 105.

On the other hand, when the assignment controller 4 assigns 6.4 kbits/s to the bearer line for the trunk channel, it provides the selector 43 with a command to select and output the coded speech signal output from the coding bit rate converter 42.

As a result, the bearer line for the DCME 103 is assigned the transmission bit rate of 6.4 kbits/s, so that it transmits the 6.4-kbit/s coded speech signal obtained by reducing the information amount from the 8-kbit/s coded speech signal.

The DCME 103 decodes the 6.4-kbit/s coded speech signal into a 64-kbit/s PCM signal, and supplies the PCM signal to the telephone 111 via the circuit switch 105.

In contrast, when the DCME 100 transmits a 6.4-kbit/s coded speech signal to the DCME 101, the DCME 101 adds the dummy data including the pseudo-speech signal control information to the 6.4-kbit/s coded speech signal, and sends the 64-kbit/s pseudo-speech signal to the circuit switch 106.

In the DCME 102, the assignment controller 4 decides the transmission bit rate to be assigned to the bearer line in accordance with the load condition on the DCME, for the trunk channel in the passthrough state in the same manner as for the trunk channel in the non-passthrough state.

When the assignment controller 4 assigns 8 kbits/s to the bearer line for the trunk channel, it provides the selector 43 with a command to select and output the coded speech signal output from the coding bit rate information adding section 30.

As a result, the bearer line for the DCME 103 is assigned the transmission bit rate of 8 kbits/s, so that it transmits the 8-kbit/s signal including the 6.4-kbit/s coded speech signal plus the coding bit rate information.

The DCME 103 recognizes the 6.4-kbit/s coded speech signal from the coding bit rate information added to the 8-kbit/s signal, decodes it into a 64-kbit/s PCM signal, and supplies the PCM signal to the telephone 111 via the circuit switch 105.

On the other hand, when the assignment controller 4 assigns 6.4 kbits/s to the bearer line for the trunk channel, it provides the selector 43 with a command to select and output the coded speech signal output from the transmission bit rate restorer 19.

As a result, the bearer line for the DCME 103 is assigned the transmission bit rate of 6.4 kbits/s, so that it transmits the 6.4-kbit/s signal.

The DCME 103 decodes the 6.4-kbit/s coded speech signal into a 64-kbit/s PCM signal, and supplies the PCM signal to the telephone 111 via the circuit switch 105.

Thus controlling the coding bit rate of the coded speech signal to be assigned to the bearer line in accordance with the relationship between the coding bit rate of the coded speech signal from the first link and the assignment to the bearer line in the second link, the present embodiment 8 can implement high quality and low bit rate transmission without degrading the speech quality in the variable bit rate DCME with the tandem passthrough function.

Incidentally, the speech multiplication equipment as shown in FIGS. 1–3 and 5–9 can be implemented by a digital signal processor in conjunction with programs carrying out the functions described above.

What is claimed is:

1. Digital circuit multiplication equipment having a tandem passthrough function of carrying out passthrough transmission of a coded speech signal, and a variable bit rate function of varying a transmission bit rate of the coded speech signal in accordance with a load on the equipment, said digital circuit multiplication equipment comprising:

dummy data adding means for generating a pseudo-speech signal with a predetermined transmission bit rate by adding dummy data including coding bit rate information to a coded speech signal supplied from a transmission line, and for supplying the pseudo-speech signal to a tandem circuit switch; speech signal extracting means for extracting a coded speech signal from a pseudo-speech signal supplied from said tandem circuit switch;

bit rate identification information adding means for adding bit rate identification information to the coded speech signal extracted by said speech signal extracting means; and speech signal output means for selecting, with reference to coding bit rate information included in the pseudo-speech signal, one of the coded speech signal extracted by said speech signal extracting means and the coded speech signal including the bit rate identification information added by said bit rate identification information adding means, and for delivering the selected coded speech signal to the transmission line.

2. The digital circuit multiplication equipment according to claim 1, further comprising load measuring means for measuring a load imposed on the equipment, wherein said speech signal output means carries out the selection of the coded speech signal only when the load on the equipment exceeds a predetermined threshold value.

3. The digital circuit multiplication equipment according to claim 2, wherein said load measuring means consists of a message number supervisor for measuring a number of messages on a message channel assigned to the transmission line.

4. The digital circuit multiplication equipment according to claim 2, wherein said load measuring means consists of a speech activity channel number supervisor for measuring a number of trunk channels in a speech active state.

5. The digital circuit multiplication equipment according to claim 2, wherein said load measuring means consists of a bearer occupancy rate supervisor for measuring a bearer occupancy rate of the transmission line.

6. The digital circuit multiplication equipment according to claim 1, further comprising information reduction means for reducing information amount of the coded speech signal extracted by said speech signal extracting means, wherein said speech signal output means selects one of three coded speech signals consisting of the coded speech signal extracted by said speech signal extracting means, the coded speech signal including the bit rate identification information added by said bit rate identification information adding means, and the coded speech signal whose information amount is reduced by said information reduction means.

7. Digital circuit multiplication equipment having a tandem passthrough function of carrying out passthrough transmission of a coded speech signal, and a variable bit rate function of varying a transmission bit rate of the coded speech signal in accordance with a load on the equipment, said digital circuit multiplication equipment comprising:

message notifying means for supplying a transmission line with a message indicating a trunk channel in a passthrough state; and bit rate fixing means for fixing, when receiving a message indicating a trunk channel in a passthrough state from the transmission line, a transmission bit rate of a coded speech signal on the trunk channel indicated by the message to a predetermined bit rate.

8. The digital circuit multiplication equipment according to claim 7, wherein when said message notifying means outputs the message, it utilizes a bearer channel number in a message channel assigned to the transmission line.

9. The digital circuit multiplication equipment according to claim 7, wherein when said message notifying means outputs the message, it utilizes a trunk channel number in a message channel assigned to the transmission line.

10. Digital circuit multiplication equipment having a tandem passthrough function of carrying out passthrough transmission of a coded speech signal, and a variable bit rate function of varying a transmission bit rate of the coded speech signal in accordance with a load on the equipment, said digital circuit multiplication equipment comprising:

detecting means for detecting a start of a passthrough operation of a trunk channel;

assignment means for assigning the trunk channel that starts the passthrough operation to a passthrough clique or a bit bank; and speech signal output means for transmitting a coded speech signal on the trunk channel through the passthrough clique or the bit bank assigned by said assignment means.

11. The digital circuit multiplication equipment according to claim 10, wherein the clique consists of a series of data sequences consisting of a message channel and a plurality of bearer channels, and the bit bank consists of a series of data sequences forming a dedicated transmission line using a plurality of bearer channels.

* * * * *